US008688259B1

(12) United States Patent
Blaine et al.

(10) Patent No.: US 8,688,259 B1
(45) Date of Patent: Apr. 1, 2014

(54) METHOD AND SYSTEM FOR PORTIONING WORKPIECES TO DIRECTLY-CONTROLLED AND/OR INDIRECTLY-CONTROLLED CHARACTERISTICS

(75) Inventors: George R. Blaine, Lake Stevens, WA (US); Craig E. Pfarr, Issaquah, WA (US); John R. Strong, Bellevue, WA (US)

(73) Assignee: John Bean Technologies Corporation, Chicago, IL (US)

( * ) Notice: Subject to any disclaimer, the term of this patent is extended or adjusted under 35 U.S.C. 154(b) by 664 days.

(21) Appl. No.: 13/013,771

(22) Filed: Jan. 25, 2011

Related U.S. Application Data

(60) Continuation-in-part of application No. 12/369,687, filed on Feb. 11, 2009, now Pat. No. 8,412,366, which is a division of application No. 11/030,622, filed on Jan. 5, 2005, now Pat. No. 7,593,785.

(60) Provisional application No. 60/535,354, filed on Jan. 9, 2004.

(51) Int. Cl.
 *G06F 19/00* (2011.01)
(52) U.S. Cl.
 USPC .............................. 700/186; 700/97; 700/103
(58) Field of Classification Search
 USPC .......................................... 700/186, 97, 103
 See application file for complete search history.

(56) References Cited

U.S. PATENT DOCUMENTS

| 3,800,650 | A | 4/1974 | Schroder |
|---|---|---|---|
| 4,962,568 | A | 10/1990 | Rudy |
| 5,076,124 | A | 12/1991 | Whitehouse |
| 5,163,865 | A | 11/1992 | Smith |
| 6,164,174 | A | 12/2000 | Sigurdsson |
| 6,612,920 | B1 | 9/2003 | Young |
| 6,974,373 | B2 | 12/2005 | Kriesel |
| 6,983,678 | B2 | 1/2006 | Wattles |
| 7,007,595 | B2 | 3/2006 | Ozery |
| 2002/0034571 | A1 | 3/2002 | Zimmerman |

FOREIGN PATENT DOCUMENTS

| GB | 2 364 894 A | 2/2002 |
|---|---|---|
| NZ | 228432 A | 5/1991 |
| WO | 02/079347 A1 | 10/2002 |

*Primary Examiner* — Tejal Gami
(74) *Attorney, Agent, or Firm* — Christensen O'Connor Johnson Kindness PLLC

(57) ABSTRACT

A method and system are provided for automatically portioning workpieces, such as food products, by simulating portioning the workpieces in accordance with one or more directly controlled characteristics (parameters/specifications) and/or indirectly controlled characteristics (parameters/specifications). The workpiece is scanned to obtain scanning information, then simulating portioning of the workpiece is carried out in accordance with the one or more directly controlled characteristics (parameters/specifications), thereby to determine the one or more indirectly controlled characteristics of the one or more final pieces to be portioned from the workpiece. The simulated portioning of the workpiece is performed for multiple combinations of one or more directly controlled characteristics until an acceptable set of one or more directly controlled characteristics and/or one or more indirectly controlled characteristics are determined.

62 Claims, 12 Drawing Sheets

METHOD AND SYSTEM FOR PORTIONING WORKPIECES TO DIRECTLY-CONTROLLED AND/OR INDIRECTLY-CONTROLLED CHARACTERISTICS

CROSS-REFERENCES TO RELATED APPLICATIONS

This application is a continuation-in-part of application Ser. No. 12/369,687, filed Feb. 11, 2009 now U.S. Pat. No. 8,412,366, which is a division of application Ser. No. 11/030,622, filed Jan. 5, 2005, now U.S. Pat. No. 7,593,785, issued Sep. 22, 2009, which claims the benefit of Provisional Application No. 60/535,354, filed Jan. 9, 2004, the disclosures of which are hereby incorporated by reference herein.

FIELD OF THE INVENTION

The present invention relates generally to processing workpieces such as food products, and more specifically, to portioning workpieces into pieces, while also considering one or more other parameters such as weight and size.

BACKGROUND OF THE INVENTION

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion the chicken breast to the weights desired by the customer, with no or limited amount of fat, so as to use the chicken breast most effectively.

Portioning and/or trimming of the workpiece can be carried out by various cutting devices, including high-speed liquid jet cutters (liquids may include, for example, water or liquid nitrogen) or rotary or reciprocating blades, after the food product is transferred from the infeed to a cutting conveyor. Once the portioning/trimming has occurred, the resulting portions are off-loaded from the cutting conveyor and placed on a take-away conveyor for further processing or, perhaps, to be placed in a storage bin.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical parameters, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources. Light from the light source is extended across the moving conveyor belt to define a sharp shadow or light stripe line. When no workpiece is being carried by the infeed conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly at an angle on the workpiece and the shadow line/light stripe. The video camera detects the displacement of the shadow line/light stripe from the position it would occupy if no workpiece were present on the conveyor belt. This displacement represents the thickness (height) of the workpiece. The width of the workpiece is determined by the width of the irregular shadow line/light stripe. The length of the workpiece is determined by the length of belt travel that shadow lines/light stripes are created by the workpiece. In this regard, an encoder is integrated into the infeed conveyor, with the encoder generating pulses at fixed distance intervals corresponding to the forward movement of the conveyor.

The data and information measured/gathered by the scanning devices are transmitted to a computer, typically on board the portioning apparatus, which records the location of the workpiece on the conveyor as well as the shape and other parameters of the workpiece. With this information, the computer determines how to optimally cut or portion the workpiece at the portioning station, and the portioning may be carried out by various types of cutting/portioning devices.

Automatic portioning systems of food products, such as boneless chicken breasts, should be capable of cutting the products into uniform shape, weight, and other parameters as provided by their users. Oftentimes, the users have finished samples that exemplify the users' particular needs, such as a sample having a desired shape.

Some conventional portioning systems use fixed forms to portion products into a specific shape. A form is like a cookie cutter that is used to stamp out a particular shape, and then the cut piece is trimmed to a desired thickness by various types of knives. The use of forms is cumbersome, in that each form is usable to stamp out only one shape, and thus many forms are required for stamping out various shapes. Also, each form stamps out pieces only to a particular shape, without considering, for example, the resulting weight. Hand cutting is also available for portioning food products into particular shapes, but cutting the products into both uniform shape and uniform weight is very difficult.

Accordingly, a need exists for an improved portioning system, which is capable of cutting workpieces to a specific shape, and of growing, shrinking, or otherwise altering the shape in order to achieve one or more additional parameters such as weight. Preferably, such a portioning system permits a user to readily define the particular shape, and any other parameter, to which workpieces are to be portioned.

The general problem of workpiece portioning, and in particular food workpiece portioning, is to fit acceptable portions into highly variable workpieces and then cut them. The workpieces to be processed, including food workpieces, vary in every dimension, have random defects, and have areas of fat and cartilage that must be avoided. The thickness varies throughout each workpiece in addition to the average thickness varying from workpiece to workpiece.

Processors of the workpieces, for example meat workpieces, expect the portions to be of a narrow weight range, to maximize the number of portions they can sell without dissatisfying anyone. Their customers expect the meat portions to be of a specific shape or close enough to it with a fairly narrow thickness range so that standardized processing can occur, such as a cooking process that will yield uniformly cooked meat. If the meat is to be placed in a bun, it is expected that the plan-view area of the meat portion should be compatible with the bun rather than disappearing inside or hanging over the bun excessively. Also, it is undesirable that large pieces of fat or cartilage exist in a portion. Also, tears, holes, and other defects are unattractive in a portion as well.

These issues are sought to be addressed by the methods and systems discussed below.

SUMMARY OF THE INVENTION

According to one aspect, the present invention is directed to an automatic portioning system to portion workpieces, which may have various thicknesses, into a weight-specific uniform shape, such as into portions having both a specific weight and a specific shape, and which thus may be of varying two-dimensional areas, or sizes (width×length), depending on the varying thickness of each workpiece. In various exemplary embodiments, this is achieved by scaling up or down a template having a specific shape on the workpiece until the desired weight is achieved. The scaled up/down template then becomes the cutting path for the workpiece. In some applications, the weight and shape requirements may be relaxed and the workpieces may be cut into portions having approximate weight and shape within user-specified ranges.

According to another aspect of the present invention, the automatic portioning system may portion workpieces into approximate weight and shape, and further within a user-specified range of area, or sizes (width×length).

According to yet another aspect of the present invention, the automatic portioning system may portion workpieces into size-specific shape, such as portions having a specific size (or size range) and a specific shape (or shape range), and thus may be of a varying weight depending on the varying thickness of each workpiece.

In any of the various embodiments of the present method summarized above, workpieces are cut into portions, each having a specific or approximate shape as predefined by the user, while also satisfying one or more other parameters. In other words, the present invention achieves completely automatic "shape" cutting. Although the methods are of particular use in the context of cutting or portioning foodstuffs in the food products industries, and are described herein relative to such application, their use is not limited to this particular application.

According to a further aspect of the present invention, a method of portioning products involves not only portioning workpieces according to shape and one or more other parameters and/or specifications, but also ensuring that the resulting product has desirable characteristics that are not directly controlled by the portioning process. For example, the method simulates portioning a workpiece to a specific shape and weight A or to the same specific shape and weight B. The method then calculates the size (width×length) and/or thickness of the piece resulting from cutting to the specific shape and weight A, or to the specific shape and weight B, respectively. If the resulting size and/or thickness of the piece portioned to the specific shape and weight A is acceptable, then the workpiece is cut to weight A. If not, it is determined if the resulting size and/or thickness of the piece portioned to the specific shape and weight B is acceptable, and if so, the workpiece is cut to weight B. If either cutting to weight A or weight B will not produce an acceptable size and/or thickness, then no solution exists and no cutting will be performed.

According to a still further aspect, the present invention permits a user to define the desired (reference) shape into which the workpieces are to be portioned, by simply scanning in the actual desired shape using the portioning system's vision system. Further, the user is allowed to edit the scanned-in shape in digital data form in order to define a refined shape template to be used in all further processing. To this end, the user can interrupt the normal operation of the automatic portioning system at any time to scan in and edit the desired shape. The desired shape is stored in computer memory and subsequently used to control the downstream cutting/portioning equipment of the portioning system to cut the workpieces into the desired shape.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE EXEMPLARY EMBODIMENTS

With respect to the terminology used in the present application, for the most part, the word "parameter" is used to refer to a physical characteristic or feature such as length, width, thickness, weight or color. Also for the most part, the word "specification" refers to a particular parameter value or range, such as a length of between 110 and 120 mm, a weight that is no more than 30 grams, or the color blue. Also, in accordance with the present application, a specific instance of a parameter will have a value, the value may or may not lie within a particular specification. In spite of the foregoing, it is within the scope of the present application to intermingle the use of the term parameter with the use of the term specification. For example, if the word specification is being utilized, this word should be interpreted broadly enough to also encompass the word parameter, and vice-versa. Also, in the present application, the word "characteristic" shall be a generic term that refers to "parameter" and/or "specification."

Figure 1A:
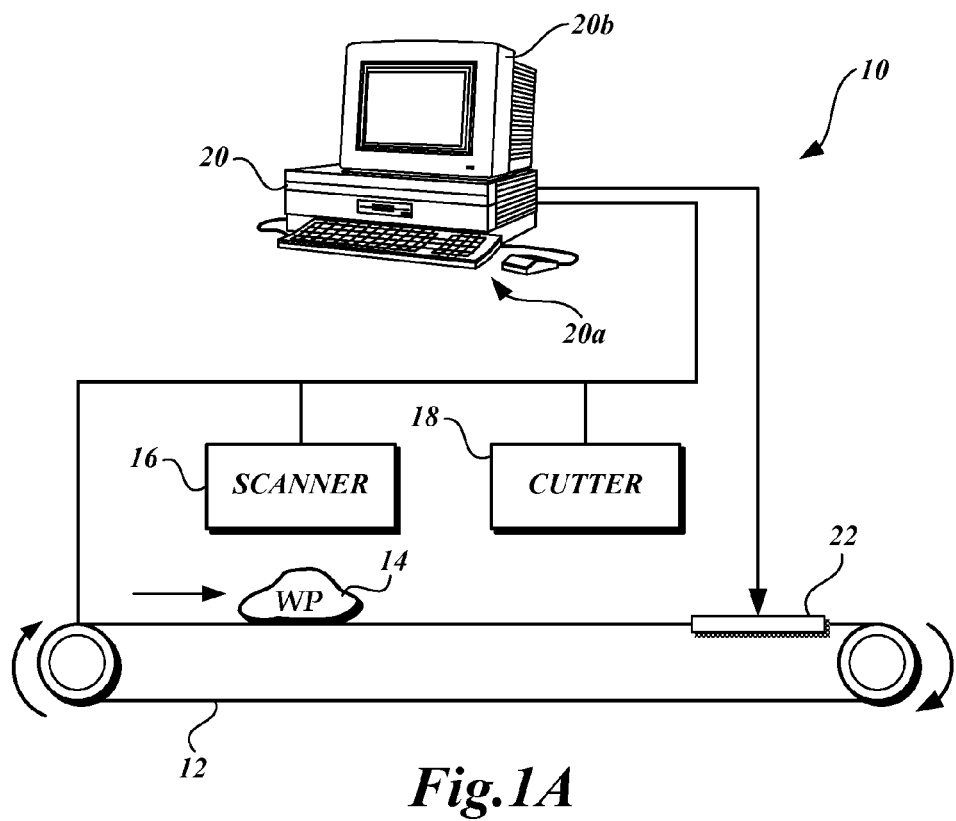
FIG. 1A illustrates a system suitable for use in performing a method of the present invention, wherein the system is operated in Normal Production Mode to process (and portion) workpieces (WP)

FIG. 1A schematically illustrates a system 10 suitable for implementing one embodiment of the present invention. The system 10 includes a conveyor 12 for carrying a workpiece 14 to be portioned thereon, a scanner 16 for scanning the workpiece 14, and a cutter 18 for portioning the workpiece (WP) 14 into one or more pieces. The conveyor 12, scanner 16, and cutter 18 are coupled to, and controlled by, a processor 20. Generally, the scanner 16 scans in the workpiece 14 to produce scanning information representative of the workpiece, and forwards the scanning information to the processor 20. The processor 20 analyzes the scanning information to calculate an optimal cut path to portion the workpiece 14 into one or more desirable pieces. Then, the processor 20 controls the cutter 18 to portion the workpiece 14 according to the calculated cut path. As illustrated, the processor includes an input device 20a (keyboard, mouse, etc.) and an output device 20b (monitor, printer, etc.). The present invention is directed generally to a system and method for cutting workpieces to a particular or approximate shape, while considering one or more other parameters (e.g., weight, length, width, height, etc.).

In various exemplary embodiments, the portioning system 10 is capable of operating in generally two modes: Normal Production Mode and Shape Input Mode. Briefly, during Shape Input Mode, a user is prompted to input and perhaps further edit a reference shape (template) to which workpieces are to be portioned. During Normal Production Mode, the portioning system automatically portions workpieces carried on a conveyor into pieces corresponding to the reference shape.

Figure 2:
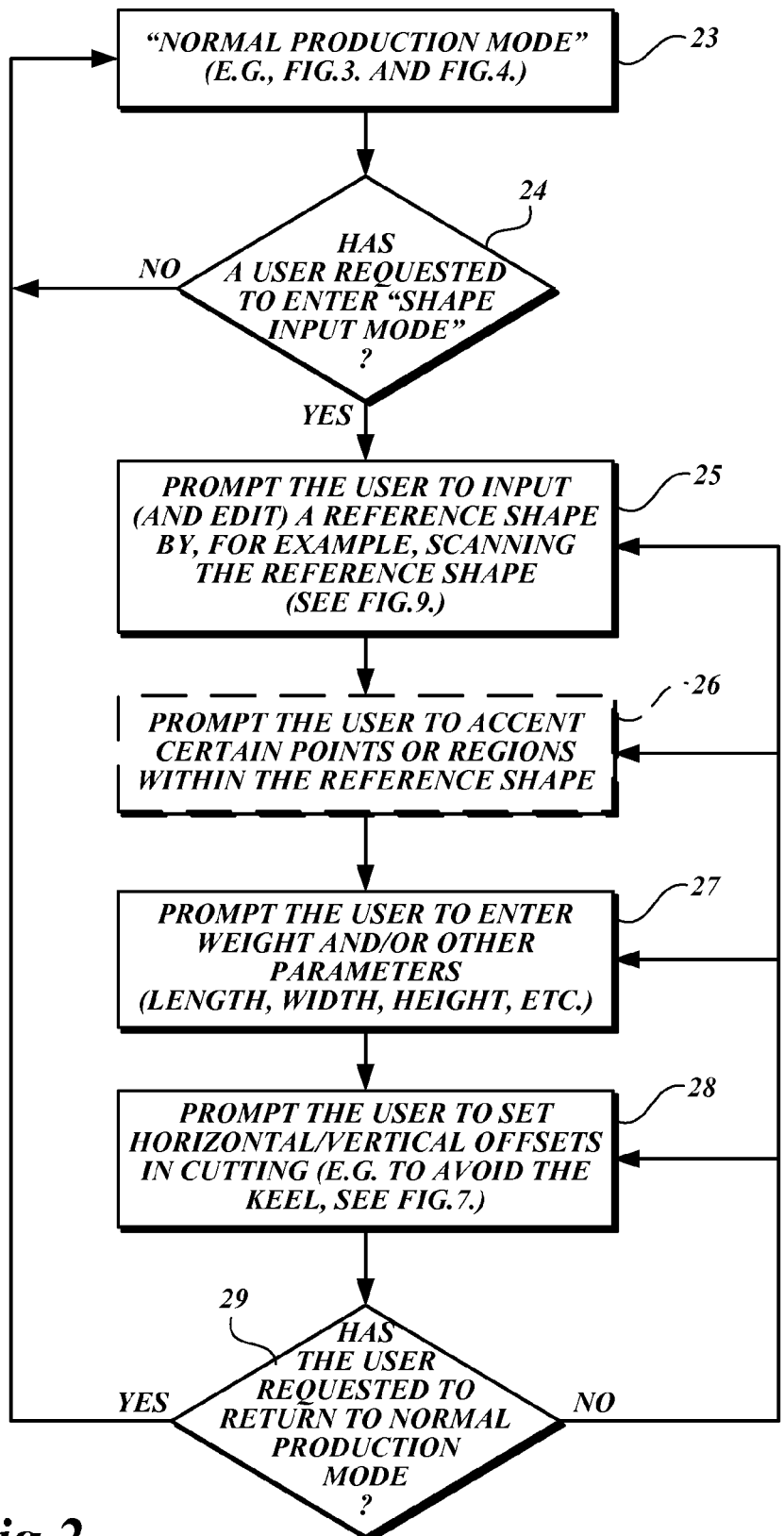
FIG. 2 is a flow chart illustrating the overall process for portioning workpieces into pieces having a specific shape while also meeting any other user-defined parameters/specifications, in accordance with one embodiment of the present invention.
Figure 7:
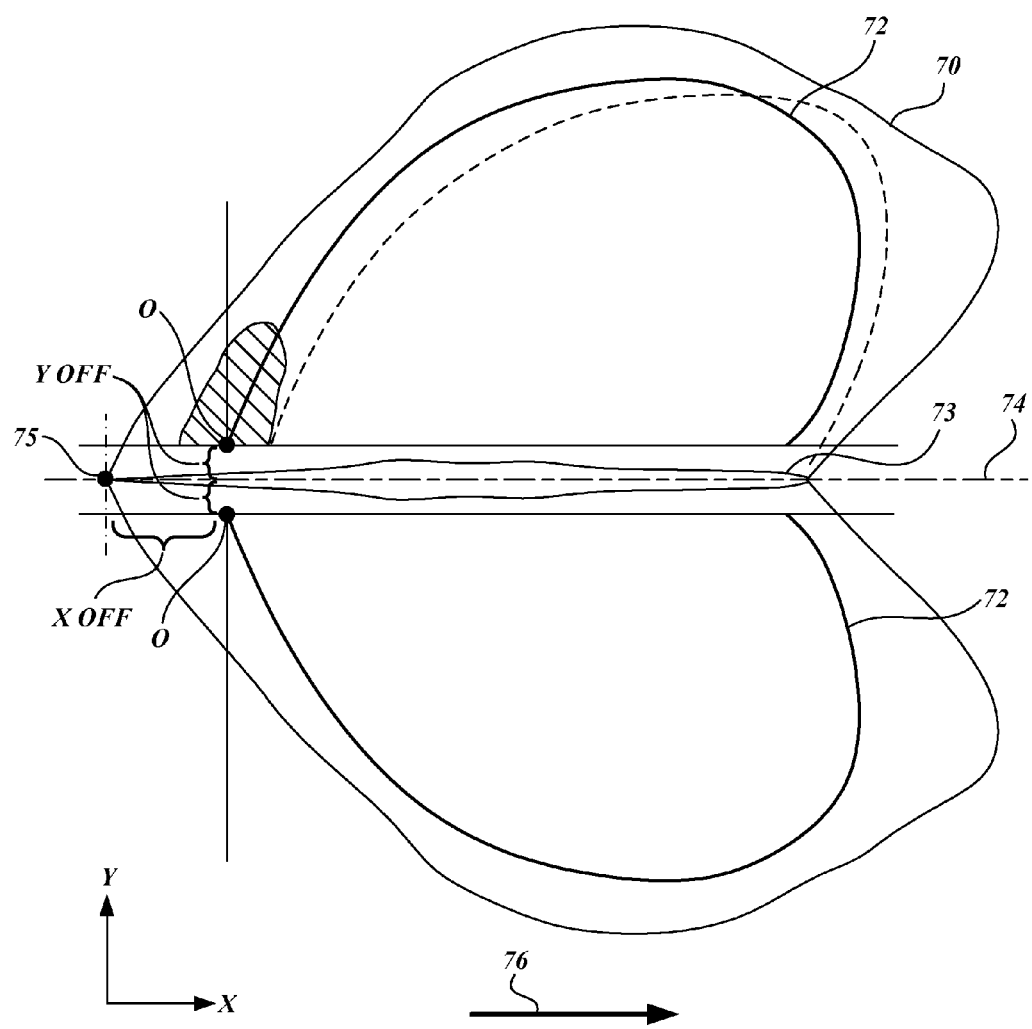
FIG. 7 illustrates a butterfly-shaped chicken breast workpiece, from which two half heart-shaped pieces are to be portioned.
Figure 8A:
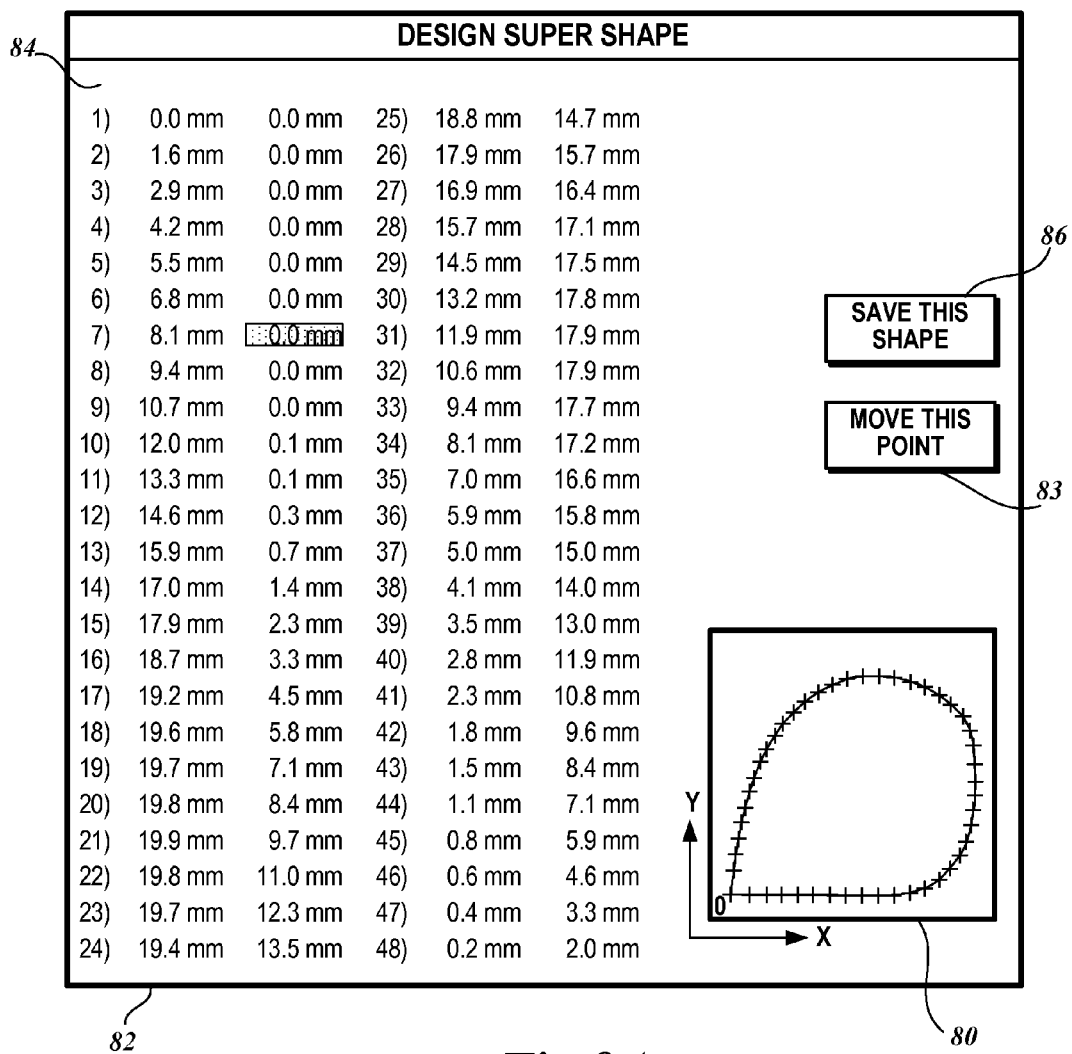
FIG. 8A is a sample screen shot, displayed on a monitor of the portioning system according to one embodiment of the present invention, defining a shape cutting path in a connect-the-dots model.

FIG. 2 is a flow chart illustrating the overall process for portioning workpieces into a specific shape and one or more user-defined parameters and/or specifications, according to one embodiment of the present invention. In step 23, the portioning system 10 is operating in Normal Production Mode. Some examples of routines to be performed in Normal Production Mode will be described in reference to FIGS. 3 and 4 below. In step 24, it is determined whether a user has requested to enter Shape Input Mode. For example, referring additionally to FIG. 1A, the user may request to enter Shape Input Mode by using any suitable input device 20a, for example, by clicking on a "Shape Input Mode" icon displayed on the monitor 20b. If such a request is received, then proceeding to step 25, the system 10 prompts the user to input (and perhaps also to edit) a reference shape, into which workpieces are to be portioned. For example, referring to FIG. 7, suppose that butterfly-shaped chicken breast workpiece 70 is to be portioned to produce one or two half heart-shaped pieces 72. The user may input the reference shape (the half-heart shape in this example) in various ways. For example, the system 10 may prestore several standard shapes, from which the user can select one as an initial template. Referring to FIG. 8A, suppose that the shape shown in a window 80 was prestored in the system 10 and selected by the user. At this point, a shape input/edit screen 82 shows the outline of the selected shape in the window 80 in a connect-the-dots model. The main screen 84 lists the X and Y coordinates of forty-eight (48) points that define the outline of the selected shape. Specifically, listed numbers 1-48 each has a pair of numbers, which show the X and Y coordinates of each point that forms the outline of the template shape shown in the window 80. The first point, which is point O at the lower left corner of the shape shown in the window 80, has the X and Y coordinates of (0,0).

At this point, the user may edit the connect-the-dots model in various ways. For example, the user may select the "move this point" icon 83 on the screen, and select a point, which will then be highlighted (see, for example, point 7 highlighted in the example of FIG. 8A). At this point, the user may use any of the arrow keys provided in any standard keyboard device 20a to move the selected point in X-Y space. For example, pressing the right arrow once will move the point to the +X direction by a certain increment, while pressing the up arrow once will move the point in the +Y direction by a certain increment.

Figure 8B:
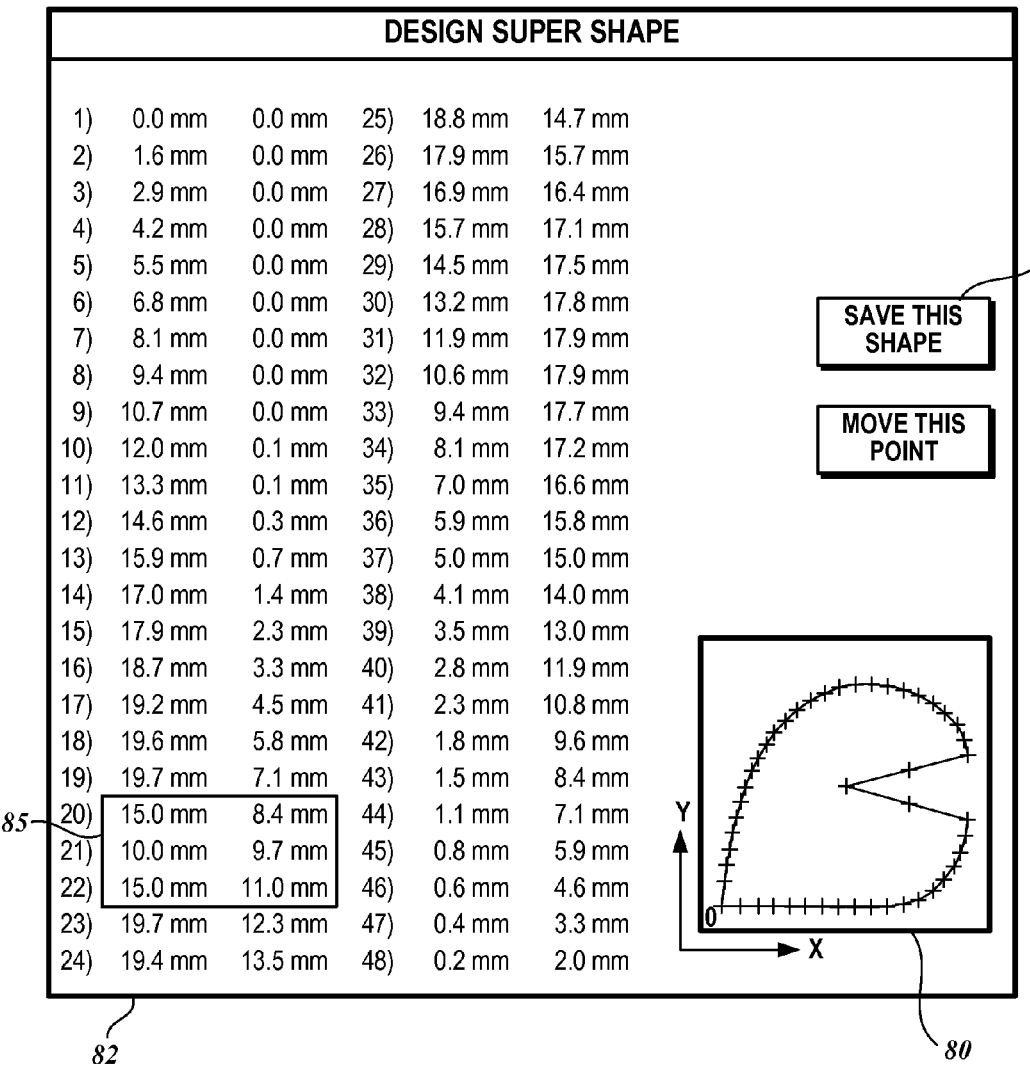
FIG. 8B is a sample screen shot of a shape cutting path, which has been modified from that shown in FIG. 8A, by including a notch into the shape of FIG. 8A.

Alternatively, referring to FIG. 8B, the user may select the X or Y value of the point the user wishes to edit, and then type in the new value directly into the list. For example, in FIG. 8B, the user may select the X and Y values of points 20, 21, and 22 by, for example, highlighting a section 85 on the screen, and then directly enter the new X and Y values to the list. As the user enters the new values, the shape outlined in the window 80 changes to correspond with the new X and Y values of these points. Once all the editing is completed and the user is satisfied with the final shape, the user may select a "save this shape" icon 86 on the screen to save the reference shape into the system memory.

While the above description describes a method of inputting a shape by editing an existing shape selected from a collection of prestored templates, it is also possible to create a new shape "from scratch," for example, by defining the X and Y coordinate values of all the points (e.g., points 1-48 in FIGS. 8A and 8B). This process may be preceded by the user plotting out a desirable shape on graph paper to ascertain X and Y values of the key points of the shape.

Further alternatively, according to one aspect of the present invention, a reference shape may be simply scanned into the system using the system's scanner 16. The method of scanning a reference shape for the purpose of creating a template will be more fully described below in reference to FIG. 9.

In one embodiment, the user-defined shapes may be stored (for example, up to 10 shapes) in the system memory so that the user can later recall any of the previously defined shapes.

Referring back to FIG. 2, after the reference shape has been entered, edited, and saved by the user, in step 26, the user may be further prompted to accent certain points or regions within the reference shape. The user-specified accent points will be used to slightly modify the reference shape (e.g., by moving in or out the accent points) when the shape requirement is not stringent, as will be more fully described below. Then, in step 27, the user is prompted to enter weight and/or other parameters of the final piece to be portioned from the workpiece. For example, the user may specify the maximum and minimum weight values for the final piece, and/or the maximum and minimum values for the length, width, and/or height (or thickness) of the final piece to be portioned from the workpiece. If the user wishes to portion workpieces into an exact weight, the user may set both the maximum and minimum weight values the same. Likewise, if any of the length, width, and height of the final product has to be at an exact value, the maximum and minimum values for that dimension may be set the same.

In step 28, the user is further prompted to set horizontal and vertical offsets to be used in cutting a workpiece. The concept of offset is described in detail in FIG. 7. In this case, from the butterfly-shaped chicken breast piece 70, two half heart-shaped pieces 72 are to be portioned. The chicken breast 70 has the keel 73 running along its center, which most users typically wish to exclude from the final products. Therefore, the user may set a Y-offset value ("Yoff"), which is a distance in the Y direction from a keel line 74 to the cutting starting point O of the half heart-shape 72, so as to avoid the keel 73. The keel line 74 for each product can be readily ascertained by the processor 20 evaluating the image obtained by scanning the workpiece 70. The user may also define an offset in the X direction ("Xoff"), which represents the distance from the trailing edge of the workpiece 70 to the cutting starting point O of the half heart-shape 72, assuming that the workpiece 70 is on a conveyor moving in the direction of an arrow 76. The user may define any desirable X and Y offsets, so as to avoid any undesirable areas in each cutting application.

Referring again back to FIG. 2, in step 29, it is determined if the user has requested to return to Normal Production Mode. If so, the process returns to step 23 and the system starts to operate in Normal Production Mode. Otherwise, the system remains in Shape Input Mode, and the user continues to input and/or edit the reference shape (step 25) and/or define various parameters and offsets (steps 26-28).

Figure 5A:
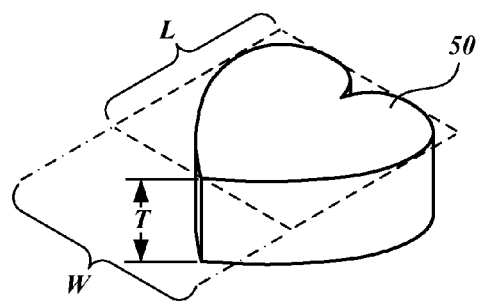
FIGS. 5A and 5B illustrate two cut pieces having the same shape and weight, but having different sizes (weight×length) due to the differences in thickness.
Figure 5B:
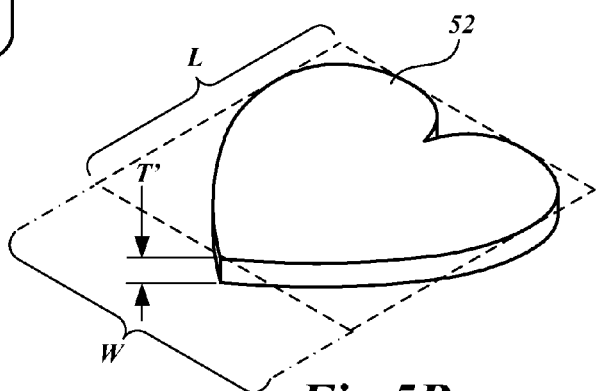

According to one aspect, the present invention is directed to an automatic portioning system to portion workpieces into a weight-specific uniform shape, such as into portions having both specific (e.g., uniform) weight (or weight range) and a specific (e.g., uniform) shape (or shape range), and therefore may be of varying sizes depending on the varying thickness of each workpiece. This concept is schematically illustrated in FIGS. 5A and 5B. In these figures, both pieces 50 and 52 have the same heart shape and also have the same weight; however, because the thickness (height) of the piece 50 is greater than that of the piece 52, the size (width×length) of the piece 50 is smaller than that of the piece 52. The thickness (height) of each workpiece, which may vary amongst multiple workpieces and also within a workpiece itself, is ascertained based on scanning, as described in the background section of the present invention above. In some cases, the thickness of workpieces may be predefined or known prior to their introduction into a system of the present invention. Further, the weight of the original workpiece, as well as the weight of each piece to be portioned from the workpiece, is calculated based on the volume, as ascertained from scanning, as multiplied by the density of the workpiece. The density may be predefined for each type of workpiece, and further may be updated based on the suitable feedback system. For example, referring to FIG. 1A, a weighing station 22 may be provided downstream from the cutter 18 to actually weigh the pieces (not shown in FIG. 1A) portioned from the original workpiece 14. The processor 20 compares the actual weight of the portioned piece with an assumed weight of the piece as previously calculated based on its volume and assumed density, and if the two values differ by more than a predefined amount, automatically updates the assumed density so as to more closely correspond with the actual weight measured at the weighing station 22.

Figure 3:
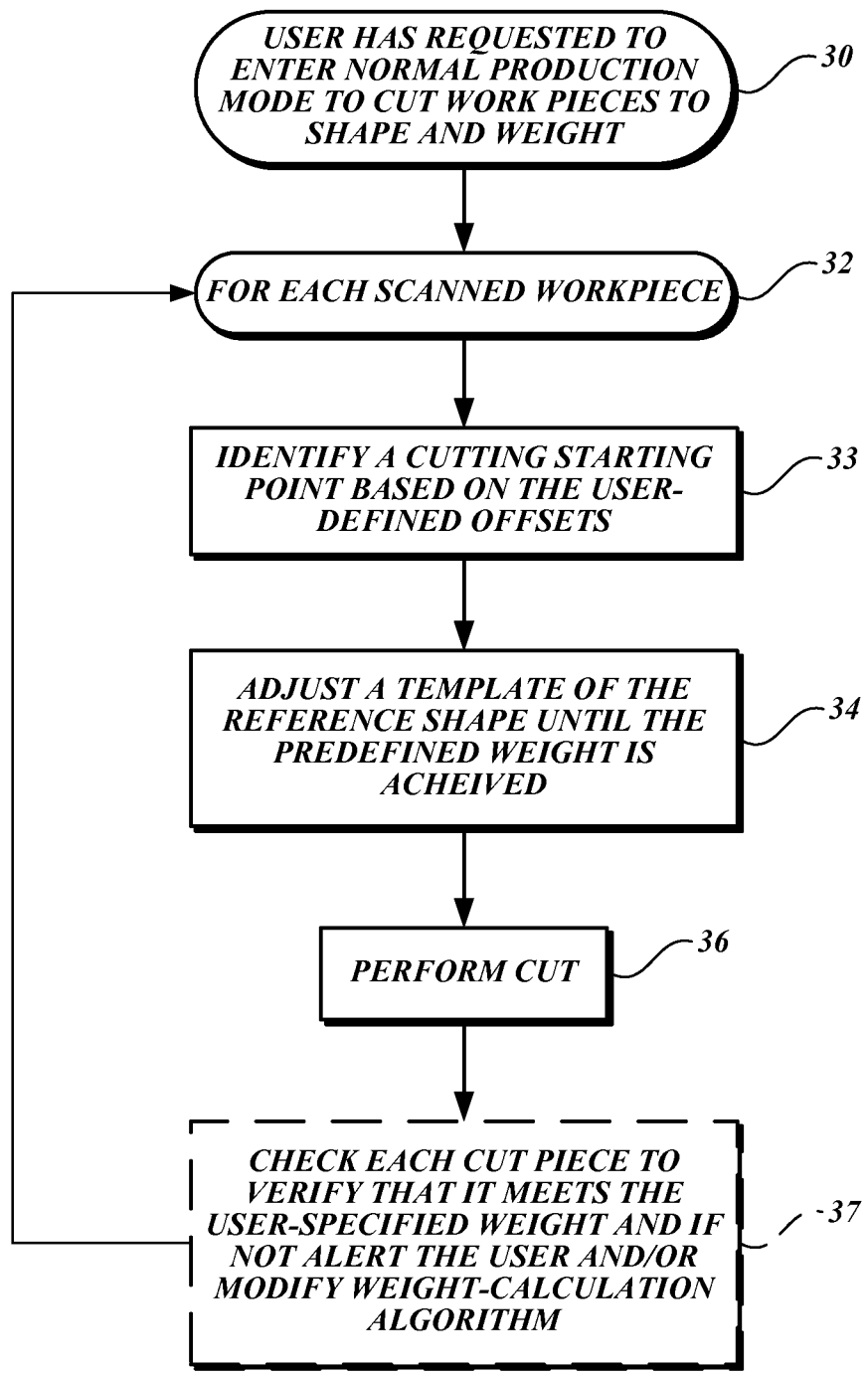
FIG. 3 is a flow chart illustrating the routine performed during Normal Production Mode of the system, in which workpieces are portioned to a specific shape and weight.

FIG. 3 is a flow chart illustrating a routine performed during Normal Production Mode, in which workpieces are to be portioned to a specific shape (or shape range) and weight (or weight range). In step 30, the user requests to enter Normal Production Mode to cut workpieces to shape and weight. Typically, the system 10 operates in Normal Production Mode by default, but entry into Normal Production Mode may be specified by the user, for example, after the user completes the operation in Shape Input Mode. Then, in Normal Production Mode, for each scanned workpiece (step 32), the processor 20 identifies a cutting starting point (see point O in FIG. 7) based on the user-defined offsets. As described above, the processor 20 can analyze the image of each incoming workpiece scanned in by the scanner 16 to identify the keel or any other landmark points, from which the cutting starting point is to be offset.

In step 34, the system automatically adjusts a template of the reference shape, previously specified by the user, until the predefined weight is achieved. For example, the template can be scaled up or down, depending on the varying thickness of each workpiece, in order to achieve uniform weight. This can be accomplished by, for example, proportionately varying the X and Y dimensions of the reference shape on the scanned-in workpiece (whose thickness and density information is known or ascertained) until the desired weight is calculated, while considering any user-defined offsets and also optionally avoiding undesirable product features such as keel, cartilage, defects, bone, and visible fat in the case of chicken and other meat. Alternatively, if the user has previously specified that the final product has to have a specific length, then the shape can be scaled up or down only in the width direction (in the Y direction in FIG. 7) without any change in the X direction, or if the user has previously specified that the final product has to have a certain width, then the template shape can be scaled up or down only in the length direction (in the X direction) without any change in the Y direction.

Further alternatively, the user may specify the amount and/or type of change allowed to the "ratio" between the length and width (e.g., Length/Width) so as to control the automatic adjustment process of a template shape. For example, the user may define that the "Length/Width" ratio may be increased from the ratio L/W of the original template shape, then the shape will be automatically stretched in the "L" direction disproportionately to any change made in the "W" direction so that the ratio L1/W1 of the resulting shape is greater than L/W. As another example, the user may define that the "Length/Width" ratio may be decreased from L/W of the original template shape, then the shape will be squashed in the "L" direction disproportionately to any change made in the "W" direction so that the ratio L2/W2 of the resulting shape is less than L/W. These types of automatic shape adjustments result in a shape that is somewhat disproportionately modified from the original template shape but that still meets a predefined weight requirement.

In some applications, the weight requirements may be relaxed and the workpieces may be cut into portions having approximate weight within a user-specified range. Likewise, the length and/or width requirements may also be relaxed depending on each application.

In step 36, the processor 20 controls the cutter 18 to cut the workpiece according to the cutting path determined in step 34 above. Then, optionally in step 37, each cut piece may be weighed, for example, at the weighing station 22 in FIG. 1A, to see if it meets the user-specified weight (or weight range), and if not, the system alerts the user and/or modifies the weight-calculation algorithm used by the system, for example, by updating the assumed density of the workpiece.

Figure 6A:
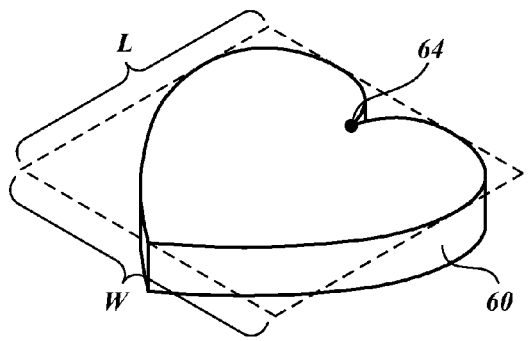
FIGS. 6A and 6B illustrate two cut pieces, wherein the shape of at least one of the pieces has been manipulated in a controlled manner so that the resulting pieces have the same weight and size, and also have generally similar shapes.
Figure 6B:
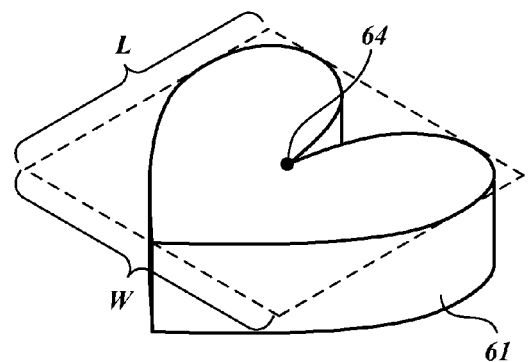

In some cases, a user desires a workpiece to be cut into only approximate shapes having both uniform weight and uniform size (width×length, measured along the plane of the conveyor) In these cases, the automatic portioning system of the present invention may permit a user to accent certain points or regions of the desired shape, and these user-specified points and regions are moved in and out (as opposed to the entire outline of the shape) until the desired weight is achieved, while also meeting the size requirement and keeping the shape generally the same as the original shape. FIGS. 6A and 6B schematically illustrate this concept, in which both portions 60 and 61 have the same weight (or weight range) and the same size (or size range) as defined by W×L (width×length). Suppose that the shape of the portion 60 is the original desirable shape, with an accent point 64 defined by the user. Suppose also that the portion 61 is thicker than the portion 60, as shown, and thus, to meet the same weight and size (width×length) requirements as the portion 60, it is necessary to somewhat modify the shape of the portion 61. As illustrated, this can be achieved by moving the accent point 64 in, so as to reduce the shape surface area of the portion 61 while maintaining the shape generally similar to the original shape. This adjustment method is suitable when the requirements for the weight and size are rather stringent, while the requirements for the shape are somewhat more relaxed.

Figure 4:
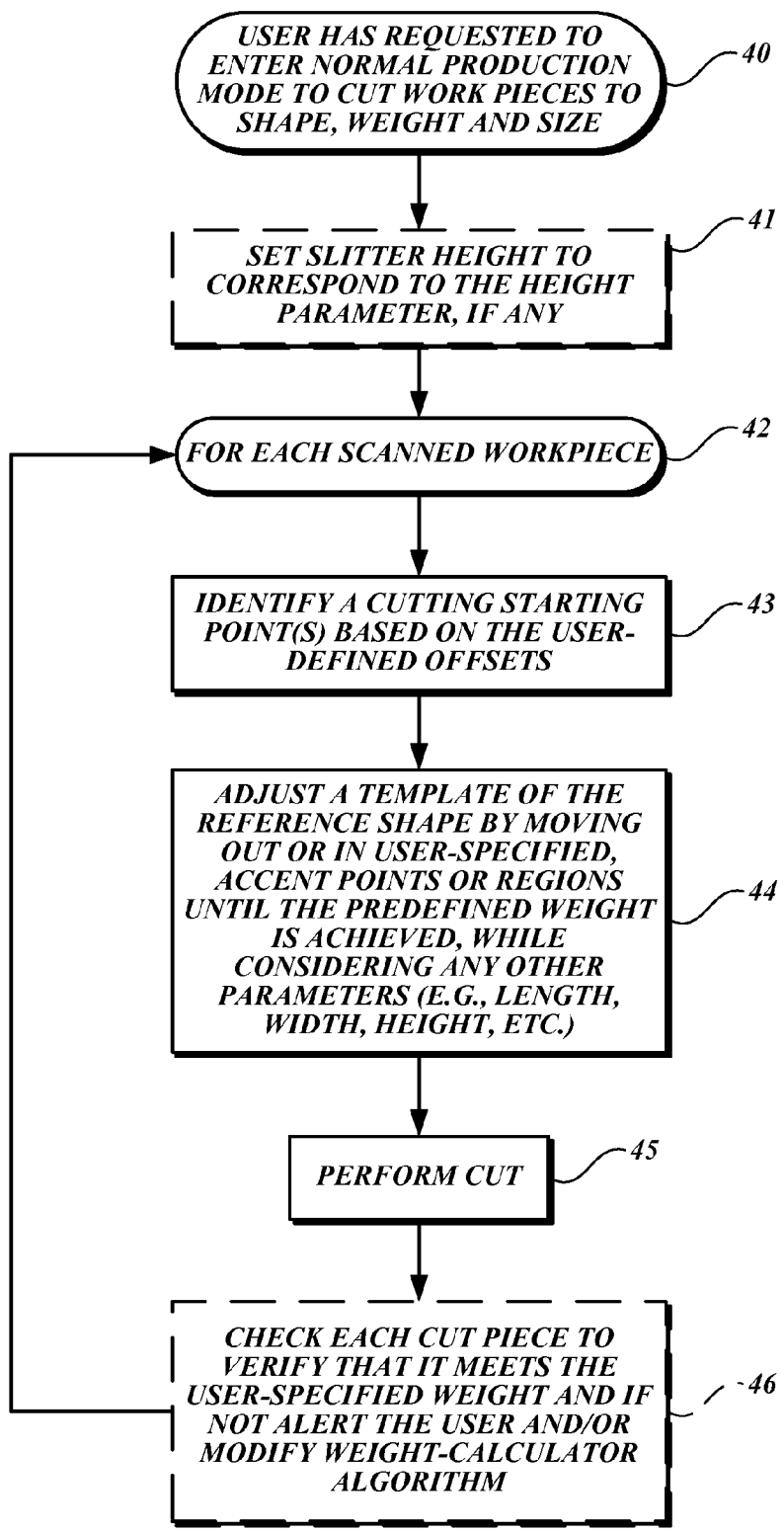
FIG. 4 is a flow chart illustrating the routine performed during Normal Production Mode of the system, wherein workpieces are portioned into a specific shape, weight, and size.

FIG. 4 is a flow chart illustrating the routine performed during Normal Production Mode to cut workpieces into size, weight, and "approximate" shape (the shape is allowed to vary somewhat), as described above in reference to FIGS. 6A and 6B (step 40). In step 41, the height of a slitter (not shown) is set to correspond to the height specification defined by the user, if any. In step 43, for each scanned workpiece (step 42), a cutting starting point to portion out a piece from the workpiece is identified based on the user-defined offsets. In step 44, a template of the reference shape, previously entered by the user, is adjusted by moving in or out any user-specified accent point(s) or region(s) until the predefined weight (or weight range) is achieved, while also considering any size related parameters (e.g., length, width, etc.). As before, the adjustment process may be carried out while considering the user defined offsets and avoiding any undesirable product features such as keel, cartilage, defects, bone, visible fat, etc. In step 45, the system then operates the cutter 18 to execute the portioning based on the adjusted template. In step 46, as before, the actual cut piece may be weighed to verify if it meets the user-specified weight, for example, by using the weighing station 22 in FIG. 1A. If the cut piece does not meet the user-specified weight, the user may be notified of the fact, and further, the system may modify its weight-calculation algorithm, for example by correcting the assumed density of the type of workpieces. The use of accent points or regions permits the user to control and constrain any changes that may be allowed to the desired shape.

FIGS. 3 and 4 above describe exemplary uses of the system for portioning workpieces to shape and weight, or to shape, weight, and size, respectively. Various alternative uses of the present system are possible, as will be apparent to one skilled in the art. For example, in one embodiment, the system of the present invention may be used to cut workpieces into a specific shape and size, regardless of weight, while optionally avoiding undesirable material, such as keel, defects, and visible fat. Further alternatively or additionally, the system may be used to cut remaining trim from the portioning process into further desired products, such as strips and nuggets. In any of the various embodiments, workpieces are cut into portions having a specific or approximate shape, while also meeting one or more other parameters/specifications as defined by the user.

Figure 1B:
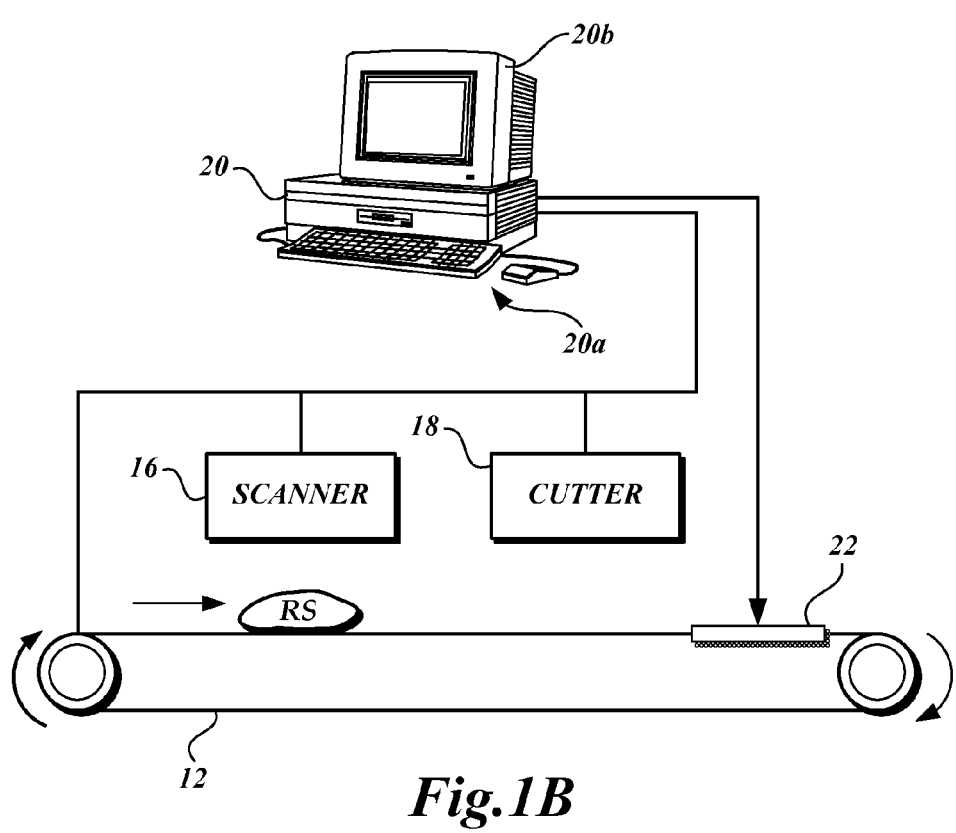
FIG. 1B illustrates the system of FIG. 1A, which is operated in Shape Scanner Mode to scan in a user-provided reference shape (RS)
Figure 9:
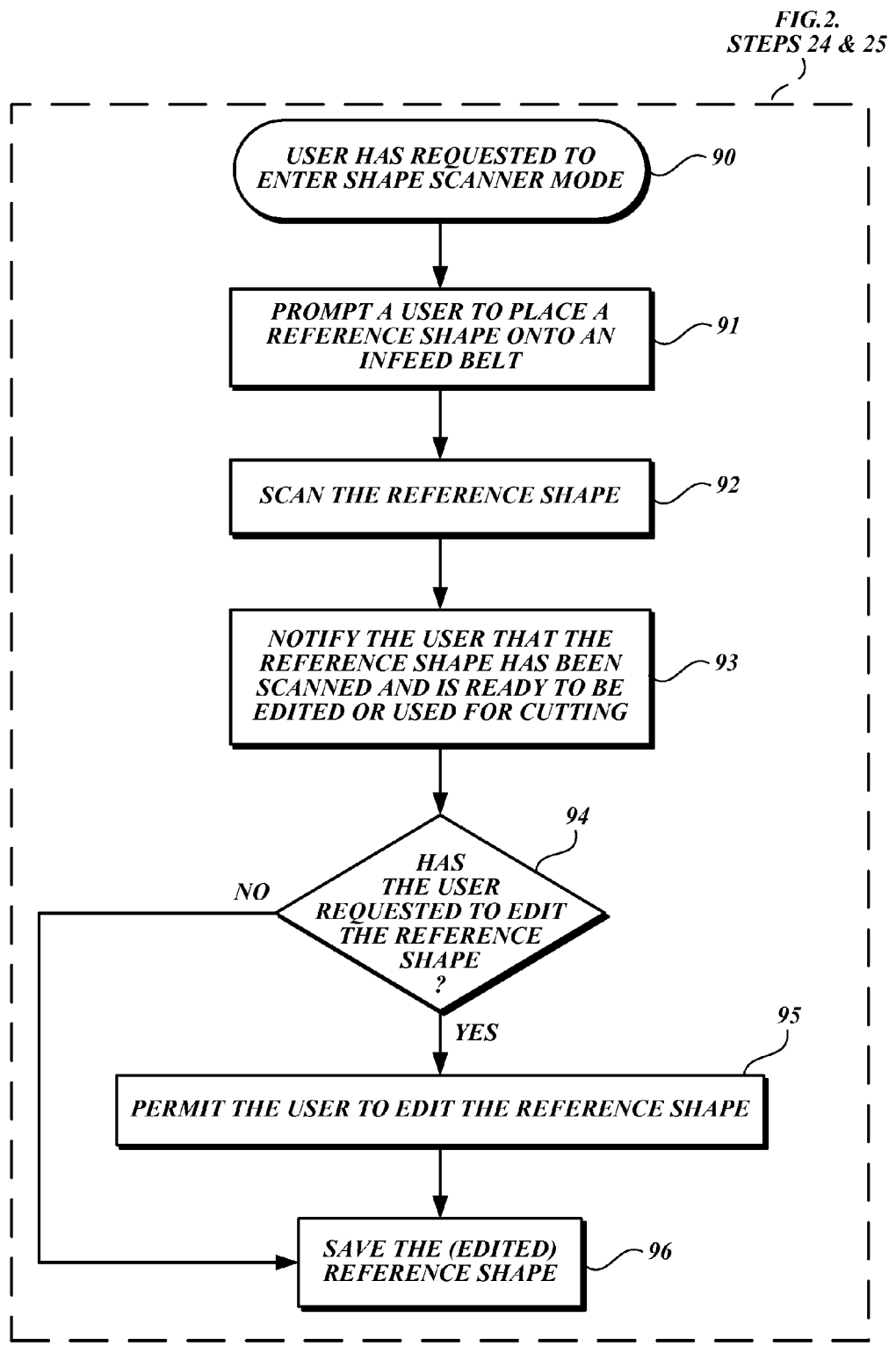
FIG. 9 is a flow chart illustrating the routine to be performed during Shape Scanner Mode, which is a special case of Shape Input Mode.

FIG. 9 is a flow chart illustrating the routine to be performed during Shape Scanner Mode, which is a special case of Shape Input Mode. Therefore, the flow chart of FIG. 9 generally replaces steps 24 and 25 of FIG. 2. In step 90, using any suitable user interface, the user requests to enter Shape Scanner Mode. (For example, by selecting the "Shape Scanner Mode" on-screen button on the monitor 20b of the system.) In step 91, the user is prompted to place a reference shape, made of any suitable material, onto an infeed belt of the system. The reference shape may be an actual product cut by scissors by the user, or may be a template shape cut out from cardboard, or made of clay, Play-Doh®, etc. Referring to FIG. 1B, once the user places the reference shape RS onto the conveyor, the scanner 16 scans in the reference shape (see step 92 of FIG. 9). Still referring to FIG. 9, in step 93, the system notifies the user that the reference shape has been scanned in and is ready to be edited or used for cutting. In step 94, it is determined whether the user has requested to edit the reference shape. If so, proceeding to step 95, the system permits the user to edit the reference shape, as previously described in reference to FIGS. 8A and 8B, above. Then, in step 96, upon user confirmation, the reference shape is saved into the system memory. Once the reference shape is saved, in various exemplary embodiments, the system instantly returns to Normal Operation Mode to use the saved reference shape in all subsequent cutting operations.

As will be apparent from FIG. 2, the user can interrupt the normal operation of the automatic portioning system 10 anytime to scan in and edit the desired shape template. The desired shape is stored into memory and will be used to control the downstream cutting/portioning equipment of the portioning system to cut the workpieces into the desired shape. In step 95 of FIG. 9, as before, the user may accent certain points or regions within the scanned-in shape for the purpose of controlling any changes allowed to the reference shape.

Accordingly, the present invention offers various methods and systems for automatically portioning workpieces into a certain or approximate shape, while also satisfying one or more other parameters defined by the user, such as weight and size. The final determination of the shape to be cut from each workpiece is further constrained by user-set values such as position offsets and avoidance areas (e.g., keel, bone, fat, etc.). Thus, in accordance with the present invention, a completely automatic shape cutting is possible, and further can be optimized, to provide for efficient cutting.

Referring to another aspect of the present invention, in order to economically produce portions of a workpiece, it is necessary to convert most of the incoming workpiece into acceptable portions. Starting with the problem of cutting one portion from each workpiece, from the foregoing description, consider a "cookie cutter" of a given shape, which has the ability to zoom in and out, thereby to increase or decrease the size of the cut portion of the workpiece to achieve desired weight range. In addition, as discussed above, consider that the aspect ratio (length/width) can vary as well. In viewing the workpiece to be portioned, the "cookie cutter" could be positioned on the workpiece in various locations along two displacement axes, as well as about a rotational axis. If the "cookie cutter" is placed over a thin area of the workpiece, it will be necessary to "zoom out" to a larger size in order to achieve the desired weight. If the "cookie cutter" is placed over a narrow area of the workpiece, it will be necessary to make the shape longer and narrower to fit. In order to cut the proper weight of the workpiece while avoiding defects—fat, cartilage, too thick areas, and too thin areas—it may be necessary to alter the aspect ratio, 2-axes position, and angle, all at the same time.

When trying to best fit or place the desired shape of a portion on a workpiece, as noted above, it can be useful to actually have the shape of the desired end portion extend off the edge of the workpiece in one or more areas. The shape of a cut portion will thus differ from the desired ideal shape to the extent that the cut shape extends past the edge of the workpiece. In some cases, a slight compromise on shape in this regard may provide the best acceptable overall solution. This deviation in shape can be quantified by several different methods.

It will often be the case that the incoming workpiece is large enough that more than one acceptable portion can be cut from it. More value to the processor will thus be provided than always only cutting one portion from the workpiece. As mentioned above, the placement of a desired end portion shape on a workpiece can be extended to the placement of two portions as well, although this is a more complex problem.

Most processors employ more than one parameter of an acceptable end portion. It is possible to consider more than one parameter (shape, size, weight, thickness, etc.) of an end portion while analyzing each incoming workpiece, and to select the end portion that is most valuable in some respect. It is also possible when placing multiple desired end portions on one incoming workpiece to have different parameters considered for each of the multiple end portions.

Also, as noted above, some types of workpieces, such as boneless chicken breast "butterflies," are essentially two similar pieces separated by a line of symmetry. In this case, each half can be treated essentially as an independent workpiece.

The decision process in determining where to locate desired portions on a workpiece can be thought of in terms of directly controlled parameters (and specifications) and indirectly controlled parameters (and specifications). For example, in algebra, Y is said to be a function of X or $Y=F(X)$. The directly controlled parameters (specifications) are the independent variables, such as "X." The indirectly controlled parameters (specifications) are the dependent variables, such as "Y," and result from the input of the directly controlled parameters (specifications). In the context of the present invention, directly controlled parameters (specifications) represent actions that occur when the workpiece is processed, e.g., portioned. Having made cuts (or simulated the cuts) of the workpiece, the resulting portions have properties that constitute the indirectly controlled parameters (specifications).

In accordance with the present invention, it is possible to consider the effect of meeting (or controlling) user-specified directly controlled parameters (specifications) and other resulting parameters (specifications) that are not directly controlled, prior to cutting. Specifically, the present invention further offers methods that may be used when a workpiece is being processed by cutting, trimming, slicing, etc., and it is desired that the resulting cut, trimmed, sliced, or otherwise processed product has particular characteristics not directly controlled by the cutting, trimming, slicing, or other process.

Examples of directly controlled parameters and specifications include:

1. Portion specification(s):
Shape of the piece or portion;
Zoom range of shape in one-dimension of the two-dimensional shape of the piece or portion;
Zoom range of shape in the other dimension of the two-dimensional shape of the piece or portion;
Zoom range in two dimensions simultaneously (enlarge or decrease size of shape of the piece or portion).
2. Positioning of portion to be achieved from workpiece:
Cross belt (X direction) range of the shape of the piece or portion relative to some references;
Down belt (Y direction) range of the shape of the piece or portion relative to some references;
Angular orientation range of the shape of the piece or portion relative to some references.
3. Number of pieces or portions to be achieved from the workpiece.
4. Angle of water jet cutter nozzles.

As noted above, the portioning and/or trimming of a workpiece can be carried out by using high-speed liquid water jet cutters. While most cutting with high-speed water jet cutters is carried out with the cutters in a vertical orientation and thus disposed normally or transversely to the workpiece, it is possible to use the high-speed water jet cutters that are set at a fixed angle from vertical, or actively control the angles of the cutters from vertical. If the angle of the water jet cutter is actively controlled, then such angle would be one of the user-controlled parameters.

Examples of indirectly controlled parameters and specifications (properties of the portions where cutting, slicing, trimming, etc., has been simulated):

1. Weight of the piece or portion.
2. Shape conformance of the cut, trim, slice, central portion, including any natural edges.
3. Average thickness of the piece or portion.
4. Maximum or peak thickness of the piece or portion.
5. Roughness or flatness, as in variability of thickness of the piece or portion.
6. Length of the piece or portion.
7. Width of the piece or portion.
8. Plan-view area of the piece or portion.
9. Amount of fat in the piece or portion.
10. Program errors.
11. Down-belt cutter travel required.
12. Holes, tears, concavity, etc., in the piece or portion It is to be understood that some of these examples of indirectly controlled parameters can also be utilized as directly controlled parameters, such as, for example, weight, length, and/or width.

In many applications where a combination of two or more characteristics (or parameters/specifications) of the finished product are sought (e.g., shape, weight, length, width, etc.), it may be that one or more of these characteristics are directly controllable, and others are indirect results of the cutting, trimming, slicing, etc., process. For example, in trimming of chicken breasts, the shape and weight of the resulting trimmed piece may be directly controllable, as described above in reference to FIG. 3, but the thickness of the resulting piece may not be directly controlled, and thus may vary among multiple final products.

According to a further aspect of the present invention, where one or more characteristics cannot be directly controlled and yet are the results of controlling the directly controllable characteristics, the directly controllable characteristics are selected so as to optimize the indirectly-controlled characteristics. Specifically, in circumstances where more than one option exists for values of the directly controllable characteristics, and where a simulation can be performed to assess the resulting indirectly-controlled characteristics prior to actually performing the cutting operations, then it is possible to achieve target values or ranges for all characteristics. The present invention provides a method of accomplishing this, where the indirectly-controlled characteristics are measured and classified into one of several categories.

In the example of portioning chicken breasts, let the first step in the process be to capture a three-dimensional image of the chicken breast using the scanner 16 connected to the processor 20, as described above. The processor 20 will then have stored in its memory a 3D model of the chicken breast that can subsequently be used to simulate the effects of various cut patterns.

Assume that one set of acceptable target shape and weight is designated as SW1 and a second set as SW2, and one acceptable thickness range is designated as T1 and a second as T2. Assume also that the following three combinations of shape and weight requirements and thickness ranges are acceptable in the finished cut product.

$SW1+T1$ $SW1+T2$ $SW2+T2$

According to one example, the method proceeds as follows:

First, using the 3D model in processor memory, the effects of cutting to shape and weight requirements SW1 are simulated.

Second, using the new product boundary resulting from the simulated cuts according to SW1, and referring again to the 3D model, the thickness statistics (average thickness, for example) within the boundary are calculated.

Third, if the thickness as simulated is within the limits of range T1 or T2, then appropriate signals are generated to actually perform the simulated cut pattern and classify/sort the resulting cut product into a category corresponding to either SW1+T1 or SW1+T2, as appropriate.

Fourth, if the simulated thickness does not fall within either range T1 or T2, using the 3D model, the effects of cutting the workpiece according to the shape and weight requirements SW2 are simulated, and the thickness within the resulting boundary is evaluated and compared to the allowable limits (for SW2 only range T2 is acceptable). If the evaluated thickness is within the range, signals are issued to perform the simulated cut pattern according to SW2+T2.

Fifth, if neither cutting to requirements SW1 nor SW2 results in a product within the acceptable thickness range(s), then no solution exists.

In the above example, rather than using discrete values for a target shape and weight, a range of values can be used for these characteristics and the above process used to seek an optimum solution within these value ranges.

Figure 10:
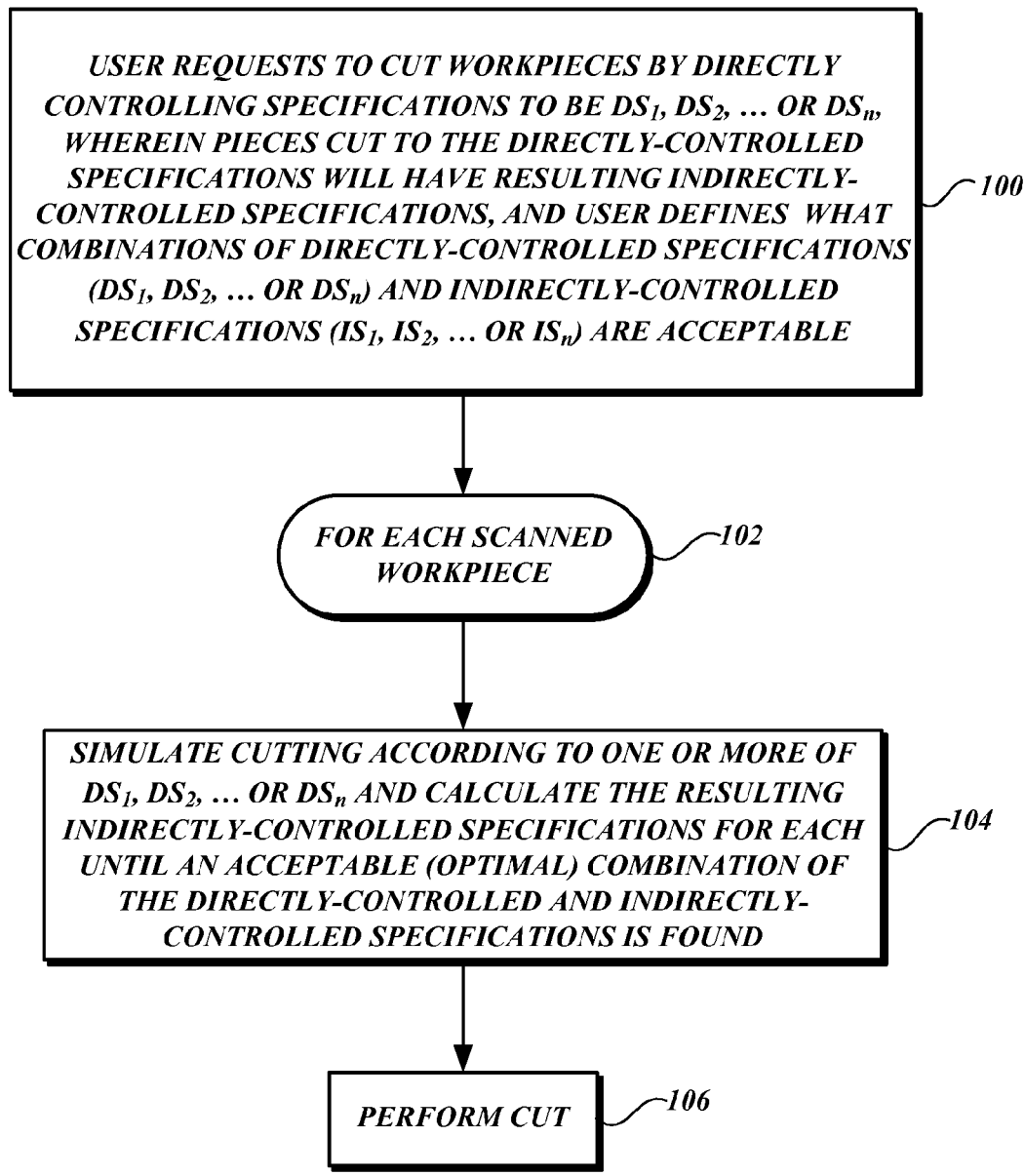
FIG. 10 is a flow chart illustrating a routine for evaluating the effects of cutting to certain specifications on the final product characteristics, which are not directly controlled by the portioning process, prior to performing an actual cut, according to a further aspect of the present invention.

FIG. 10 is a flow chart illustrating a general process of evaluating what effects cutting a workpiece according to certain parameters/specifications will have on the cut piece's other characteristics, which are not directly controlled by the cutting process, to ensure that the final piece will have desirable indirectly-controlled characteristics. In step 100, a user requests to cut workpieces by directly controlling certain parameters (e.g., shape, weight, position, angular orientation, number of portions to be obtained from the work product, etc.) so that they fall within one of multiple acceptable categories, such as by ensuring that one of multiple specification requirements DS1, DS2, . . . or DSn is met. Further, the user requests that the pieces cut to the specification requirements DS1, DS2, . . . or DSn need to have one or more resulting indirectly-controlled characteristic(s) (e.g., thickness, weight, shape, conformance, etc.), IS1, IS2, . . . or ISn. Then, for each scanned workpiece (block 102), in block 104, cutting the workpiece according to one or more of the directly-controlled specifications (DS1, DS2, . . . or DSn) is simulated, and the resulting indirectly-controlled specification(s) is calculated. For example, cutting according to the specification DS1 is simulated, and the indirectly-controlled specification (e.g., thickness) resulting from cutting to the specification DS1 is calculated. If an acceptable combination of DS1, DS2, . . . or DSn and IS1, IS2, . . . or ISn is found, then the acceptable combination may be selected as the combination according to which the subsequent cut is to be performed. Various methods for selecting one combination are possible. For example, as with the previous example, it is possible to continue the simulation and calculation process until the first acceptable combination is found.

Alternatively, a value function (or its negative/opposite, a cost function) may be used to rank multiple alternative solutions. According to this variation, cutting to the multiple specification requirements (DS1, DS2, . . . or DSn, in this example) is simulated, and the resulting indirectly-controlled specification(s) (e.g., thickness) are calculated for each simulation and compared to the acceptable indirectly-controlled specification(s) (IS1, IS2, . . . or ISn). If multiple acceptable combinations exist, a suitable value function is used to select the most preferable combination.

After the acceptable, optimal combination of DS1, DS2, . . . or DSn and IS1, IS2, . . . or ISn is found, then proceeding to step 106, the portioning system is used to perform an actual cut according to the selected combination of the directly-controlled and indirectly-controlled specifications.

As a further aspect of the present invention, each of the characteristics, i.e., parameters/specifications, both direct and indirect, can potentially have an acceptable range rather than just a single acceptable value. It is possible to define a "cost" function that has a value of zero at the center of each range of each specification, with an increasing "cost" as the simulated values of the parameters deviate from the center of the specification range. Further, a weighting factor can be applied to the "cost" from each of the parameters. Finally, the "weighted costs" are combined, such as by addition, to give a "total cost." Thus, for each combination of the directly controlled characteristic and resulting indirectly controlled characteristic, there is a single "total cost" amount associated with the simulated cutting/trimming/slicing, etc., result. It is to be understood that the term "cost" as used herein refers to the negative or opposite of the word "value" discussed above. These terms are related in the sense that with respect to a particular specification, an increase in the "cost" corresponds to a decrease in the "value."

The cost function definition could take almost any form, including one-sided definitions where the characteristic can never be above or below a threshold, and the target (zero cost) value is something other than the middle of a range. An example of this exists from packaged grocery goods where it is legally required that a container not contain less than the labeled amount. However, it is clearly in the interest of the product producer to be as close as possible to the labeled amount.

Examples of three cost functions that can be used include:

1. The cost increases with deviation from the range midpoint, and continues increasing for parameter values beyond the range;

2. The cost increases from a deviation from the range midpoint, with "hard" limits (for example, large step function cost increase) at the range limits;

3. There is no cost associated with values within the range, with "hard" limits at the range limits.

The "total cost" number is used with a multi-dimensional optimization technique, such as the "Gradient Descent" minimization algorithm, to find an optimal choice of directly controlled parameters/specifications. Within a limited number of steps or iterations, it is possible to find the optimal solution without having to consider all of the perhaps thousands of potential combinations of directly controlled parameter values. Examples of non-linear algorithms similar to Gradient Descent include the Gauss-Newton method, the BFGS method, and the Levenberg-Marquardt method. Other algorithms or analysis methods that may be utilized in this regard include, for example Nelder-Mead method, differential evolutions methods, genetic algorithms, and particle swarm optimization. Of course, in the range of interest, linear algorithms and analysis techniques can be used to arrive at an optimum choice of directly controlled parameters It is to be understood that in the above description of identifying optimum directly-controlled and/or indirectly-controlled parameters and specifications, a cost function analysis has been utilized. However, it is to be understood that the negative or opposite concept of a value function could be utilized instead. In this case, a multi-dimensional maximization technique or algorithm would be utilized to arrive at optimal directly and/or indirectly controlled parameters/specifications.

There can be dependencies between the parameters that can be exploited to simplify the solution methods. An example of this is aspect ratio, length and width, each being a parameter despite their obvious dependence. The user may only need to specify length and width ranges, with the aspect ratio being "worked out" in the software.

There are instances in which parameters are chosen as directly controlled parameters. Two examples are set forth below. To simplify the present discussion, the examples include only one portion to be derived from a workpiece and only one parameter/specification for the portion.

As a first example, the primary method is to start with a specified shape and as directly controlled parameters zoom in or zoom out in one dimension, such as width, zoom in or out in a second dimension, such as length, move the shape across the workpiece, move the shape lengthwise of the workpiece, and rotate the shape to various angles. Even though weight is one of the main parameters that may be targeted, this analysis allows weight to be an indirectly controlled parameter, which depends on various degrees of zooming and moving about the workpiece to locate an acceptable thickness for the portion. This is considered to be an efficient analysis method.

An alternative methodology is to begin with a specified shape and, as directly controlled parameters, utilize weight, aspect ratio (ratio of length over width), movement of the shape up and down the length of the workpiece, movement of the shape across the width of the workpiece, and rotation of the shape to various angles. In the background, in a separate algorithm, the zoom (enlargement or reduction) on the shape is adjusted, until a specified weight or weight range is achieved. In this alternative method, "zoom" is then an indirectly controlled parameter.

Figure 11:
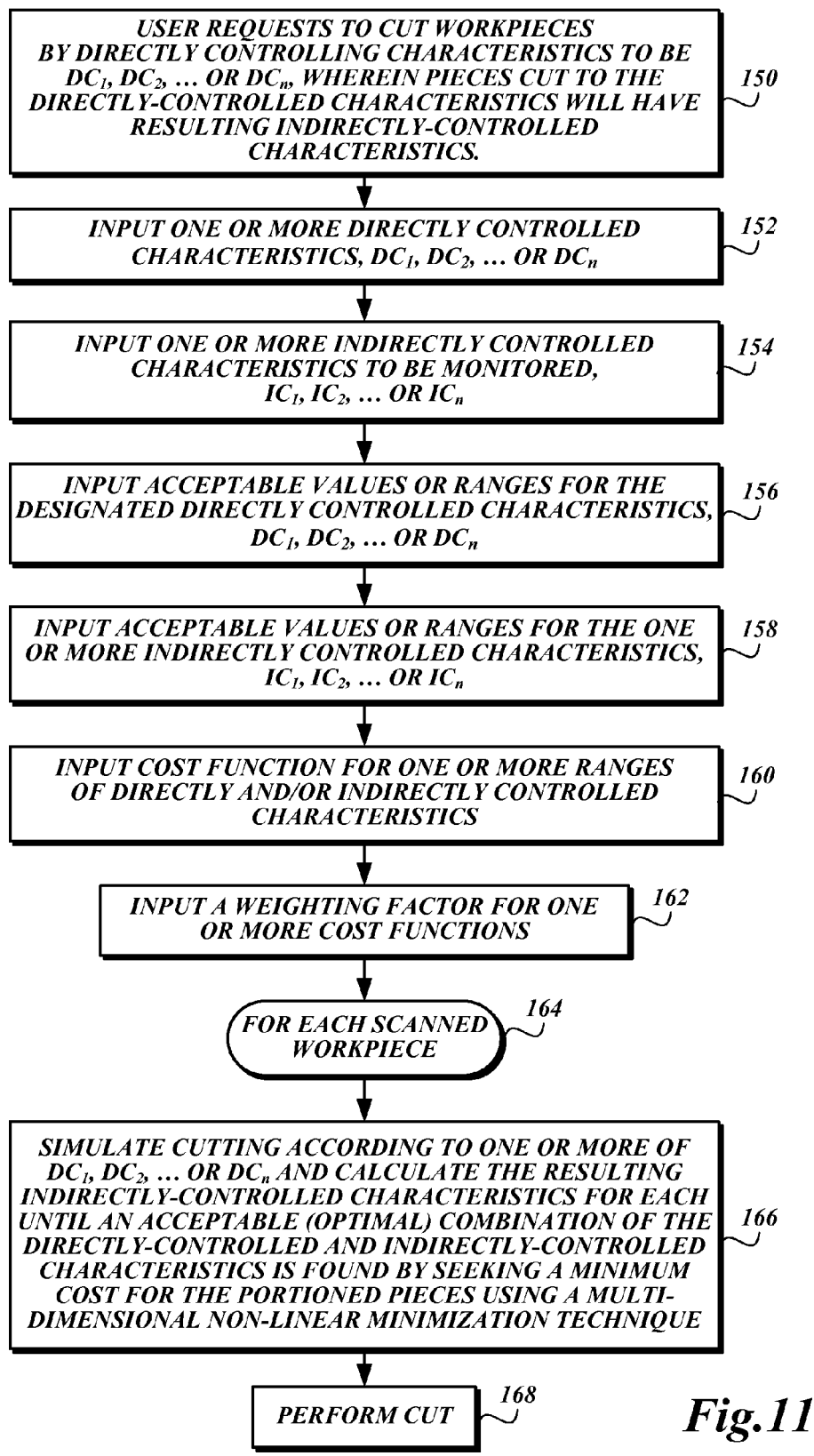
FIG. 11 is a flow chart illustrating a routine for evaluating the effects on indirectly controlled parameters or specifications of a workpiece based on selected directly controlled parameters or specifications prior to performing an actual cut, according to another aspect of the present invention.

FIG. 11 is a flow chart illustrating one example of a process or method for determining how to cut a workpiece according to one or more directly controlled characteristics (parameters or specifications) to achieve desired one or more indirectly controlled characteristics (parameters or specifications) of the resulting portioned piece. Although the example pertains to cutting a workpiece, other processes may be applied to the workpiece, either in conjunction with cutting or in lieu of cutting, such as trimming the workpiece, slicing the workpiece, or performing one or more other operations on the workpiece.

In step 150, a user requests to cut the workpieces by directly controlling certain characteristics (parameters or specifications), for example, shape, shape range, position of the portion on the workpiece, or number of portions to be derived from the workpiece, so that the resulting portions meet the characteristic (parameter/specification) requirement(s) or the characteristic ranges $DC_1, DC_2, \ldots$ and/or $DC_n$ are met.

In the process, in step 152, the user inputs one or more directly controlled characteristics $DC_1, DC_2, \ldots DC_n$.

Next in step 154, the user inputs one or more resulting indirectly-controlled characteristics (parameters or specifications) to be met by the portions that meet the characteristic requirements of $DC_1, DC_2, \ldots$ and/or $DC_n$.

Figure 12:
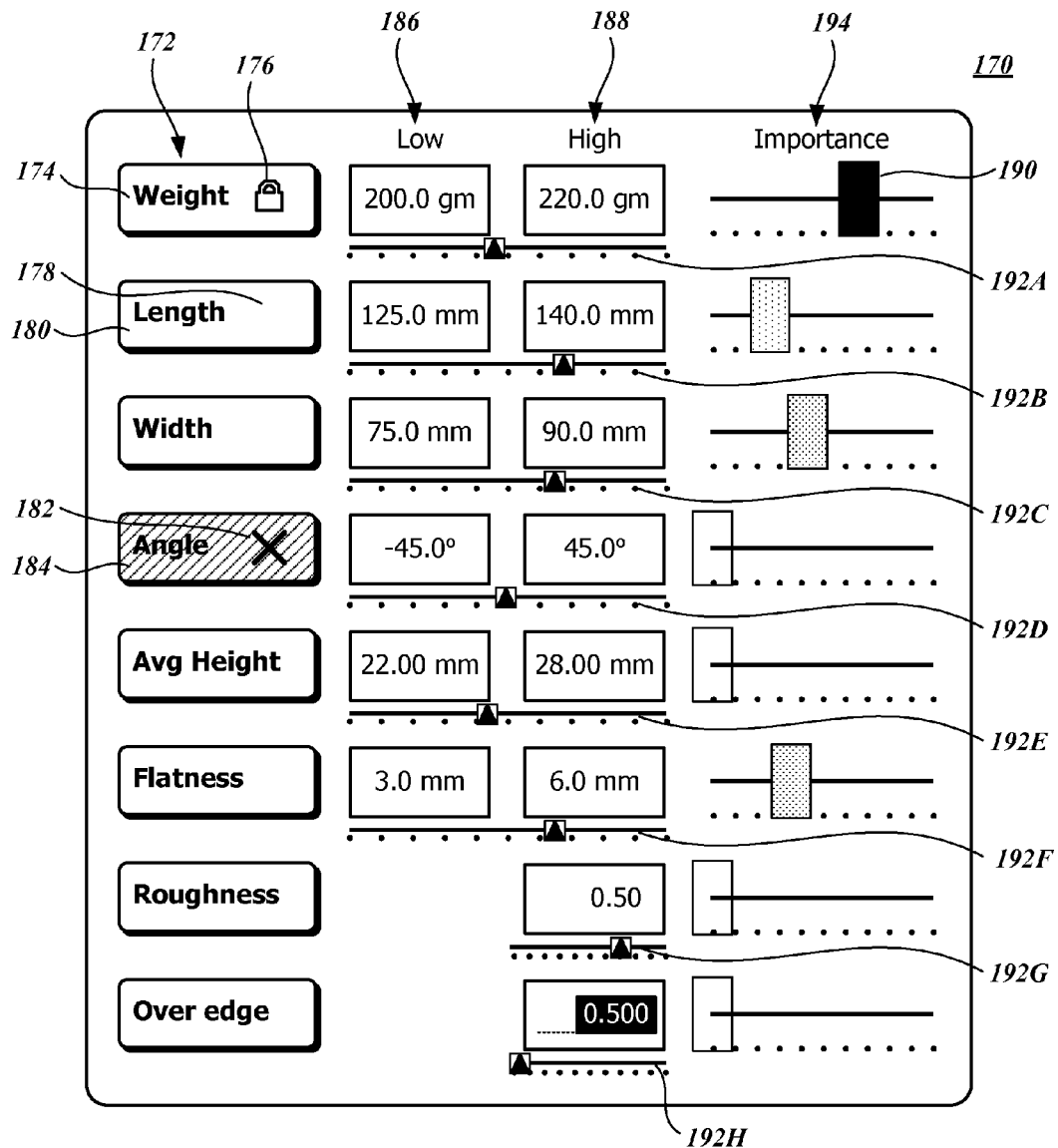
FIG. 12 illustrates a graphical user interface that may be employed with the systems and methods of the present invention, including that illustrated in FIG. 11.

Next at step 156, the user inputs acceptable ranges of values for the directly controlled characteristics (parameters or specifications) $DC_1, DC_2, \ldots$ and/or $DC_n$. As discussed below, this can be performed using a graphical user interface, for example, as shown in FIG. 12. This example varies from the example above at pages 23-25 in that in the present example, specification ranges are specified by the parameter being utilized. Nonetheless, it is to be understood that a specific value can be specified for one or more of the parameters being utilized.

Next in step 158, acceptable values or ranges for the one or more indirectly controlled characteristics (parameters or specifications) are inputted. Again, this can be accomplished by using the graphical user interface of FIG. 12.

Next in step 160, cost functions can be assigned to one or more of the directly controlled and/or indirectly controlled characteristics (parameters or specifications). As discussed above, the cost function can have a value of zero at the center of the range of each specification, with an increasing cost as the simulated value of the parameter in question deviates from the center of the specification range. Also, as discussed above, the cost function definition can take many other forms, including one-sided "definitions" where parameters can never be above or below a threshold value, and the target (zero cost) value is other than at the middle of a range.

Next at step 162, a weighting factor can be assigned to one or more of the costs of a parameter, thereby to establish that some cost factors are more important or less important than other cost factors. The weighing of a cost factor can also be inputted by utilizing the graphical user interface illustrated in FIG. 12.

Then for the scanned workpiece (block 164), in block 166, simulating the cutting of the workpiece occurs according to the one or more directly-controlled characteristics (parameters or specifications) ($DC_1, DC_2, \ldots$ and/or $DC_n$), and the resulting indirectly-controlled characteristics (parameters or specifications) are calculated or determined using, for example, processor 20. For example, cutting according to characteristic $DC_1$ is simulated and the indirectly-controlled parameter (e.g., weight) resulting from the cutting to the characteristic $DC_1$ is calculated. This may be carried out by seeking to minimize the "total cost" of the resulting portion using a multi-dimensional minimization technique. In this manner, a minimum cost or an acceptable cost can be achieved, typically after a discrete number of calculation iterations. This eliminates the need to perform calculations for every possible acceptable directly-controlled characteristic(s) $DC_1$, $DC_2$, ... and/or $DC_n$.

After an acceptable and/or optimal combination of directly controlled parameters and specifications and/or indirectly controlled parameters and specifications is arrived at, then, at step 168, the portioning system is used to perform cutting according to the selected combination for the directly-controlled and indirectly controlled parameter(s)/specification(s).

FIG. 12 shows a portion of a graphical user interface (GUI) 170 that may be used in conjunction with the present invention. In the GUI of FIG. 12, the column of parameters 172 extending down the left side of the GUI (weight, length, width, angle, etc.) are parameters (mostly indirectly controlled) that contribute to the cost function. By repeatedly pushing the touch screen buttons, such as weight 174, the weight value toggles through having a padlock symbol, such as 176 on button 174, no symbol 178 on button 180, or color an "X" symbol 182 on pink colored button 184, which correspond to the different cost function descriptions noted earlier. The no symbol 178 on button 180 corresponds to the first cost function described above, the padlock symbol 176 on button 174 corresponds to the second function described above, and the "X" 182 on pink colored button 184 corresponds to the third cost function described above.

The columns in FIG. 12 labeled low 186 and high 188 contain user-settable values of the minimum and maximum value per product specifications of the end products. The horizontal lines 192A through 192H, each with a triangular shape disposed thereon, show a short-term average value of recent settings so that the user can visualize the process of the present invention that is occurring.

The rectangularly-shaped sliders 168 located under the "Importance" header 194 let the user adjust the weighting coefficients in the cost function for individual parameters. The system of the present invention seeks to keep the specifications within bounds, particularly for the parameters that are given the greater importance. However, algorithms cannot "create" input portions that do not exist given the parameters and specifications specified. Thus, for example, if the thickness of the workpiece is too thin throughout the entire workpiece such that within the length and width limits it is not possible to achieve the desired weight, some other solution will have to be sought.

In the example of FIG. 12, the Weight parameter is set to be near the center of the range (see 192A), but the Length and Width parameters (see 192B and 192C) are above the center of their ranges because the workpiece is too thin. The Weight value is closer to the center of the range than the Length and Width values because Weight was given a greater importance. The shape that is being zoomed and moved about the workpiece is specified in another part of a GUI.

In FIG. 12, specific parameters may be considered in portioning a workpiece. Not all of these parameters need be considered in each instance that workpieces are being portioned. Also, other sets of parameters may be used in conjunction with a portioning system or machine. Also, it is anticipated that the system operator will set the specification ranges in columns 186 and 180 as well as the weighing level (Importance) column 194. Moreover, these settings may be changed quite often, for example, to adjust for changes in the physical attributes or types of workpieces being processed.

In some situations, such as end portions to be placed in a "family pack" of retail meat packages, there is little desire for close weight control of the portions. In such an instance, the weight setting along the "Importance line" may be moved all the way to the left, and some other parameter's importance moved up the scale (to the right).

Another situation with a different need for weight control is when an adaptive slicer follows a portioner. In that situation, the portioner computer plans for having the slicer bring the weight to the correct level so that the importance of the Length and Width parameters would increase and the Weight simply needs to be greater than or equal to the desired final weight.

The above discussion has noted several complexities that can exist in using the present system and method in actual production situations. Applicants note that the extent of the complexities existing in production situations can vary widely. Some of the common production situations in terms of portions derived from a single workpiece (or "double" workpiece consisting of a chicken breast butterfly) include, for example:

1. One portion derived from a workpiece using one parameter/specification.
2. One portion derived from a workpiece using more than one parameter or specification.
3. Two portions derived from a workpiece, each with the same parameter or specification.
4. A combination of the three options above, depending on the options that are derivable from the incoming workpiece.
5. One normal sized portion derived from the workpiece, plus numerous small portions (for example, nuggets or strips) that utilize most of the remaining workpiece. The multiple small portions can be viewed as a set, rather than individual small portions.
6. Two portions of two different parameters/specifications derived from a workpiece with specified general locations for each portion so that production personnel can identify which portion corresponds to which location.
7. Two portions using two or more different parameters/specifications derived from the workpiece with the portions obtained from the workpiece at whatever locations best meet the parameters/specifications.

It will be understood that the foregoing are examples only and that other production situations are possible and can be accommodated utilizing the present invention.

In addition to the parameters and specifications noted above, there are other parameters and specifications that could be utilized in conjunction with the present system and method. For example, if the production situation consists of two or more portions derived from a single workpiece, there are specific requirements that may be desirable. One such requirement would be to locate the portions on the workpiece so that most of the trimming required of the workpiece occurs at one location. In this situation, perhaps the two or more portions would be located toward one end of the workpiece. Another potential specific requirement may be maximizing the thickness of the trim from the workpiece for later use in other purposes.

Another strategy for deriving two or more portions from a workpiece includes utilizing initial or "seed" locations for the two or more portions at specific locations on the workpiece. For example, when two portions are to be derived from a workpiece, the portions can be "seeded" at locations at opposite ends of the workpiece. Thereafter a first step of the production methodology or algorithm can be applied to one potential end portion, then the same step applied to the second potential end portion using a completely separate "run" of the algorithm. This alternating process can be continued until optimum locations for the potential end portions are found. If at some point in the process the two potential end portions overlap each other, when the cost minimization algorithm is carried out, a very high "cost" penalty could be assessed for such "crossing." The concept of this strategy is to have two independent minimization processes occurring at the same time, with the only interdependence being a cost penalty for "crossing" of the potential end portions.

A variation of the foregoing methodology is to simply double the number of directly controlled parameters/specifications to include lateral and longitudinal positions, rotational position, and two zoom directions (length and width) for both of the potential end portions.

As alluded to above, potential strategy for seeking one normal size portion plus many small portions from a workpiece is to treat the small portions (nuggets or strips) as a collection constituting a second portion. A second separate algorithm is utilized to divide this second portion into individual nuggets or strips. The individual small portions can be simple rectangular shapes or of more complex shape—for example, a shape having a curved or non-linear side that automatically nests against the adjacent portion, thereby conforming to the adjacent portion. This strategy could provide a maximum amount of work product for use as nuggets or strips as well as minimizing the amount of cutting required to produce the nuggets and/or strips.

A variation of the foregoing potential strategy is to define a composite larger portion on a workpiece that consists of two portions butted or nested together wherein the shape objectives of both portions are achieved. There could be some tolerance or variation at the interface of the two shapes where, for example, the shapes can slide somewhat relative to each other or be angled or rotated somewhat relative to each other. As a further aspect of the present disclosure, the methodology described above can be utilized to identify one or more parameter values that represent physical attributes or features of a workpiece which, in turn, can be employed to better characterize or model the specific workpiece. For example, with respect to the example of chicken breast butterfly, as noted above, such workpieces include a keel, such as keel 73 of chicken breast 70, shown in FIG. 7. The keel 73 runs along the center of the chicken breast, and most users typically wish to exclude the keel from the final cut portions. Knowing the location of the keel on the chicken breast is helpful to know where the chicken breast can be cut to eliminate the keel. Moreover, the location of the keel helps to define or characterize the position and angular orientation of the chicken breast, for example, on the conveyor 12, shown in FIG. 1A.

Utilizing the present invention, the shape of the keel of a chicken breast can be used as an independent parameter, and the processor 20 and scanner 16 are employed to locate the keel on the workpiece. This keel identification process occurs following scanning. In addition, the rest of the portioning process, including determining where to place portions, as well as trimming the workpiece, would follow. Once the keel is identified, the coordinates of the workpiece, initially determined by the scanning process, may be transformed based on more accurate information or data obtained from the keel identification process. In short, locating parameter values that represent the physical attribute or feature of the keel can help to better determine or identify the location, position, orientation, etc., of the workpiece, as well as the location and configuration of typical features of the workpiece. This information can be used to better determine how and where to cut, trim, slice, or otherwise process the workpiece.

As noted above, identifying the keel and knowing its overall length and width may make possible the ability to directly infer other characteristics of the butterfly workpiece. Moreover, this information could enable a simplified mathematical model of the, for example, butterfly workpiece to be created that could characterize a wide range of individual butterfly workpieces, in a manner similar to how a skilled sidewalk artist can create recognizable faces by modifying just a few key facial characteristics in otherwise very similar drawings. The input parameters of this mathematical model could be used as directly controlled specifications. In this case, the user can utilize the identified keel to limit the range of characteristics that need be considered in determining how to portion, trim, or otherwise process the workpiece.

The foregoing methodology can be used with other types of workpieces, such as fish, steaks, rack of ribs, etc. Of course, each of these other types of workpieces would be defined with different mathematical models. Nonetheless, most meats, fish, poultry, or other types of workpieces have features that are a function of the species of the workpiece and/or a function of the upstream processing of the workpiece, such as the deboning of poultry or fish. To the extent that the foregoing techniques can be used to create simplified models of these workpieces and then fit individual portions to be cut to the simplified models, more intelligent decisions can be made as to how and where to cut, trim, or otherwise process a workpiece. For example, the process can be used to identify the location of a bone to miss during cutting or trimming, or the location of a tendon, so as to slow the speed of the cutter passing over the tendon. Also, this process can be used to reduce the typical ambiguity in trimming fat, since the present technique can be used to identify the anatomical location of the attached fat to be removed, as opposed to perhaps simply a scrap of fat that happens to be lying loosely on top of the workpiece. In essence, the present technique can be used to augment scanning techniques currently utilized, as described above.

While the preferred embodiments of the invention have been illustrated and described, it will be appreciated that various changes can be made therein without departing from the spirit and scope of the invention. In this regard, the steps of the methods described herein can be carried out in sequences other than specified. Also, one or more of the specified steps can be deleted or modified from that described herein. Also, other modifications can be made to the methods described herein.

The embodiments of the invention in which an exclusive property or privilege is claimed are defined as follows:

1. A method of automatically portioning a workpiece into one or more final pieces, comprising:
    (a) designating one or more directly-controlled characteristics and one or more indirectly-controlled characteristics for one or more final pieces to be portioned from each workpiece;
    (b) scanning the workpiece to obtain scanning information;
    (c) simulating portioning the workpiece according to one or more directly-controlled characteristics and calculating the one or more indirectly-controlled characteristics of the one or more final pieces to be portioned according to the one or more directly-controlled characteristics;
    (d) repeating step (c) for multiple combinations of the one or more directly controlled characteristics, and rating each combination based on how closely the combination achieves the desired one or more directly controlled characteristics and/or the one or more indirectly controlled characteristics; and
    (e) determining an acceptable combination of the one or more directly-controlled characteristics and the one or more indirectly-controlled characteristics, by using one or more algorithms to analyze potentially acceptable one or more directly controlled characteristics until at least one acceptable set of one or more directly controlled characteristics and one or more indirectly controlled characteristics are determined, comprising:
(i) rating the combinations according to one of:
(a) a cost function as applied to one or more directly controlled and/or indirectly controlled characteristics, with the cost applied to the one or more directly controlled and/or indirectly controlled characteristics increasing in value as the one or more directly controlled and/or indirectly controlled characteristics deviates from an ideal characteristic value or level; and
(b) a value function as applied to one or more of the one or more directly controlled and/or indirectly controlled characteristics, with the value applied to the one or more directly controlled and/or indirectly controlled characteristics, reducing as the one or more directly controlled and/or indirectly controlled characteristics deviates from an ideal value or level;
(ii) using a multi-dimensional analysis technique to seek combinations of the one or more directly controlled and/or indirectly controlled characteristics based on minimizing the total cost of the combination of the one or more directly controlled characteristics and/or indirectly controlled characteristics, or based on maximizing the total value of the combination of the one or more directly controlled characteristics and/or indirectly controlled characteristics; and
(f) portioning the workpiece according to a determined acceptable combination of characteristics.

2. The method of claim 1, wherein each combination is rated according to an optimization function as applied to one or more of the one or more directly controlled and/or indirectly controlled characteristics, with the optimization rating of the one or more directly controlled and/or indirectly controlled characteristics related to the deviation of the one or more directly controlled and/or indirectly controlled characteristics from an ideal characteristic level.

3. The method of claim 1, wherein a weight factor is imposed on one or more of the directly controlled and/or indirectly controlled characteristics.

4. The method of claim 1, wherein one or more of the directly controlled characteristics and/or indirectly controlled characteristics has an acceptable range, with the best optimization of the directly controlled characterization and indirectly controlled characterization at a specific location along the acceptable range.

5. The method of claim 4, wherein the ideal optimization of the directly controlled and/or indirectly controlled characteristics is at the center of the acceptable range.

6. The method of claim 4, wherein the acceptable range of the one or more directly controlled characteristics and/or indirectly controlled characteristics cannot exceed beyond a specified limit imposed on the acceptable range.

7. The method of claim 2, wherein a multi-dimensional analysis technique is employed to seek optimum combinations of the one or more directly controlled characteristics and/or indirectly controlled characteristics.

8. The method of claim 1, wherein step (c) is repeated for multiple acceptable combinations of one or more directly controlled characteristics, and step (e) comprises selecting an optimal combination from the multiple acceptable combinations according to a value function that ranks the multiple acceptable combinations.

9. The method of claim 8, wherein in the ranking of the multiple accepted combinations, the one or more of the directly controlled and/or indirectly controlled characteristics are weighted in value.

10. The method of claim 1, wherein the one or more directly controlled characteristics are selected from the group of characteristics consisting of:
the shape of the one or more final pieces to be portioned from the workpiece;
the size of the one or more final pieces to be portioned from the workpiece;
the location on the workpiece that the one or more final pieces are to be portioned from the workpiece;
positioning on the workpiece the one or more final pieces to be portioned from the workpiece;
the number of final pieces to be portioned from the workpiece;
the weight of the one or more final pieces to be portioned from the workpiece;
the angle of cutters used to portion the workpiece; and
the shape of physical attribute or feature of the workpiece.

11. The method of claim 10, wherein the size characteristic of the one or more final pieces to be portioned from the workpiece is selected from the group consisting of: increasing or decreasing the size of the workpiece in a first dimension; increasing or decreasing the size of the workpiece in a second dimension; increasing or decreasing the size of the workpiece in two dimensions simultaneously; and increasing or decreasing the size of the workpiece in one dimension relative to the second dimension.

12. The method of claim 10, wherein the directly controlled characteristic of positioning the final piece to be portioned from the workpiece is selected from the group consisting of positioning the final piece to be portioned in a first direction relative to the workpiece, positioning the final piece to be portioned in a second direction relative to the workpiece substantially laterally to the first direction; and altering the angular orientation of the final piece to be portioned relative to the workpiece.

13. The method of claim 12, wherein in the directly controlled characteristic of positioning the final piece to be portioned about the workpiece, at least a portion of the desired shape of the final piece extends beyond the perimeter of the workpiece.

14. The method of claim 10, wherein the number of final pieces to be portioned from the workpiece is selected from the group consisting of:
one final piece to be portioned from the workpiece utilizing one directly controlled characteristic;
one final piece to be portioned from the workpiece utilizing more than one directly controlled characteristic;
two final pieces to be portioned from the workpiece, utilizing the same directly controlled characteristic;
two final pieces to be portioned from the workpiece and each final piece utilizing two or more different characteristics for each final piece; and
more than two final pieces to be portioned from each workpiece, and each final piece utilizing at least two sets of different directly controlled characteristics.

15. The method of claim 10, wherein:
a plurality of final pieces are to be portioned from the workpiece; and
the directly controlled characteristic of positioning the final pieces to be portioned from the workpiece is selected from the group consisting of:

locating the final pieces on the workpiece so that most of the trimming required of the workpiece occurs at a single location;

utilizing initial locations for the plurality final pieces at specific locations on the workpiece, and thereafter applying an optimization algorithm to the final pieces until optimum locations for the final pieces are located on the workpiece;

locating the plurality of final pieces as a single composite portion on the workpiece, with the final pieces nested together;

locating the plurality of final pieces as a single composite portion on the workpiece, with the final pieces contiguous to each other;

locating the plurality of final pieces on the workpiece using an optimization algorithm that prohibits the final pieces from overlapping each other on the workpiece; and locating the plurality of final pieces on the workpiece after analyzing the position of each final piece at multiple potential positions about the workpiece.

16. The method of claim 10, wherein:

a plurality of final pieces are to be portioned from the workpiece; and the directly controlled characteristic of the shapes of the final pieces is selected from the group consisting of:

the shapes of the final pieces to be portioned from the workpiece comprise a first nominal sized portion and a plurality of significantly smaller sized final pieces that are collectively treated as a nominal sized second portion, with an algorithm or analysis technique utilized to divide the second portion into a plurality of smaller sized individual final pieces; and the shapes of the final pieces to be portioned from the workpiece comprise a single composite portion of the individual final pieces nested together.

17. The method of claim 1, wherein the indirectly controlled characteristics are selected from the group consisting of:

the weight of the portioned final piece;
the shape conformance of the portioned final piece;
the average thickness of the portioned final piece;
the maximum thickness of the portioned final piece;
the flatness of the portioned final piece;
the roughness of the portioned final piece;
the length of the portioned final piece;
the width of the portioned final piece;
the plan-view area of the portioned final piece;
the amount of fat present on the portioned final piece;
program errors occurring;
errors in model of the workpiece defined by scanning a workpiece; and
the extent of discontinuities of the portioned final piece.

18. The method of claim 17, wherein the indirectly controlled characteristic of the shape conformance of the portioned final piece includes consideration of the extent of the use of the natural edge of the workpiece as part of the characteristic of the portioned final piece.

19. The method of claim 1, further comprising:

selecting one or more potential physical attributes of the workpiece as a directly controlled parameter;

analyzing the workpiece to locate the physical attribute on the workpiece; and if the physical attribute is located on the workpiece, updating the scanning information based on the location and characteristics of the physical attribute located on the workpiece.

20. A system for portioning a workpiece into one or more final pieces, comprising:

a scanner for scanning the workpiece;
a cutter for portioning the workpiece; and
a processor coupled to the scanner and the cutter, the processor controlled by computer-executable instructions for performing the steps of:

(a) receiving multiple acceptable combinations of one or more directly-controlled characteristics and one or more indirectly-controlled characteristics of one or more final pieces to be portioned from each workpiece;

(b) controlling the scanner to scan a workpiece to obtain scanning information;

(c) simulating portioning the scanned-in workpiece according to one or more directly-controlled characteristics and calculating the one or more indirectly-controlled characteristics of the one or more final pieces to be portioned according to the one or more directly-controlled characteristics;

(d) repeating step (c) for multiple combinations of the one or more directly controlled characteristics, and rating each combination based on how close the combination achieves the desired one or more directly controlled characteristics and/or the one or more indirectly controlled characteristics;

(e) determining an acceptable combination of the one or more directly-controlled characteristics and the one or more indirectly-controlled characteristics by using one or more algorithms to analyze potentially acceptable one or more directly controlled characteristics until at least one acceptable set of one or more directly controlled characteristics and one or more indirectly controlled characteristics is determined; comprising:

(i) rating each combination according to one of:

a cost function as applied to one or more of the one or more directly controlled and/or indirectly controlled characteristics, with the cost applied to the one or more directly controlled and/or indirectly controlled characteristics increasing as the one or more directly controlled and/or indirectly controlled characteristic deviates from an ideal characteristic value or level; and a value function is applied to one or more of the one or more directly controlled and/or indirectly controlled characteristics, with the value applied to the one or more directly controlled and/or indirectly controlled characteristics, decreasing as the one or more directly controlled and/or indirectly controlled characteristics deviates from an ideal characteristic value or level; and (ii) employing a multi-dimensional optimization algorithm to seek acceptable combinations of the one or more directly controlled characteristics and/or indirectly controlled characteristics based on one of:

minimizing the total cost of the combination of the one or more directly controlled characteristics and/or indirectly controlled characteristics; and maximizing the value of a combination of the one or more directly controlled characteristics and/or indirectly controlled characteristics; and (f) controlling the cutter to portion the workpiece according to the acceptable combination of characteristics as determined in step (e) above.

21. The system of claim 20, further comprising a conveyor for carrying the workpiece to be portioned as well as during portioning.

22. The system of claim 20, further comprising a user interface system that permits a user to enter and/or alter the one or more directly controlled characteristics and/or the one or more indirectly controlled characteristics.

23. The system of claim 20, wherein the user interface system enables the user to specify an allowable range of the one or more directly controlled characteristics and/or one or more of the indirectly controlled characteristics.

24. The system of claim 20, wherein a weight factor is imposed on one or more of the costs of the one or more directly controlled and/or indirectly controlled characteristics.

25. The system of claim 24, wherein one or more of the directly controlled characteristics and/or indirectly controlled characteristics has an acceptable range, and the cost function has a minimum value at a specific location along the acceptable range.

26. The system of claim 20, wherein the one or more directly controlled characteristics are selected from the group of characteristics consisting of:
   the shape of the one or more final pieces to be portioned from the workpiece;
   the size of the one or more final pieces to be portioned from the workpiece;
   the location on the workpiece that the one or more final pieces are to be portioned from the workpiece;
   positioning on the workpiece the one or more final pieces to be portioned from the workpiece;
   the number of final pieces to be portioned from the workpiece;
   the weight of the one or more final pieces to be portioned from the workpiece;
   the angle of cutters used to portion the workpiece; and
   physical attributes or features of the workpiece.

27. The system of claim 26, wherein the number of final pieces to be portioned from the workpiece is selected from the group consisting of:
   one final piece to be portioned from the workpiece, utilizing one directly controlled characteristic;
   one final piece to be portioned from the workpiece, utilizing more than one directly controlled characteristic;
   two final pieces to be portioned from the workpiece, utilizing the same directly controlled characteristic for each final piece;
   two final pieces to be portioned from the workpiece and each final piece utilizing two or more different characteristics; and
   more than two final pieces to be portioned from each workpiece and each final piece utilizing at least two sets of different directly controlled characteristics.

28. The system of claim 20, wherein the indirectly controlled characteristics are selected from the group consisting of:
   the weight of the portioned final piece;
   the shape conformance of the portioned final piece;
   the average thickness of the portioned final piece;
   the maximum thickness of the portioned final piece;
   the flatness of the portioned final piece;
   the roughness of the portioned final piece;
   the length of the portioned final piece;
   the width of the portioned final piece;
   the plan-view area of the portioned final piece;
   the amount of fat present on the portioned final piece;
   program errors occurring;
   errors in the shape, size, or position of the workpiece determined by scanning the workpiece; and
   the extent of discontinuities of the portioned final piece.

29. The system of claim 20, wherein:
   (a) one or more of the directly controlled characteristics comprises one or more parameters controlling the shape of a representation of a physical feature potentially present on the workpiece;
   (b) the processor controlling the scanner to determine if the shape of the representation of the physical feature is present on the workpiece and, if so, where on the workpiece, and determine the specific configuration of the representation of the located physical feature; and
   (c) the scanning information is updated based on the information derived in step (b).

30. A computer-readable medium including computer-executable instructions which, when loaded onto a computer, perform a method comprising:
   (a) simulating portioning a workpiece into one or more final pieces according to one or more directly-controlled characteristics and calculating the one or more indirectly-controlled characteristics of the one or more final pieces to be portioned from the workpiece according to the one or more directly-controlled characteristics;
   (b) repeating step (a) for multiple combinations of the one or more directly controlled characteristics, and rating each combination based on how close the combination achieves the desired one or more directly controlled characteristics and/or the one or more indirectly controlled characteristics; and
   (c) determining an acceptable combination of the one or more directly-controlled characteristics and the one or more indirectly-controlled characteristics by using one or more algorithms to analyze potentially acceptable one or more directly controlled characteristics until at least one acceptable set of one or more directly controlled characteristics and one or more indirectly controlled characteristics is determined; comprising:
      (i) rating of the combinations according to one of:
         (a) a cost function as applied to one or more of the one or more directly controlled and/or indirectly controlled characteristics, with the cost applied to the one or more directly controlled and/or indirectly controlled characteristics increasing as the one or more directly controlled and/or indirectly controlled characteristic deviates from an ideal characteristic value or level; and
         (b) a value function as applied to one or more of the one or more directly controlled and/or indirectly controlled characteristics, with the value applied to the one or more directly controlled and/or indirectly controlled characteristics decreasing as the one or more directly controlled and/or indirectly controlled characteristics deviates from an ideal characteristic value or level; and
      (ii) employing a multi-dimensional optimized technique to seek combinations of the one or more directly controlled characteristics and/or indirectly controlled characteristics based on minimizing the total cost of the combination of the one or more directly controlled characteristics and/or indirectly controlled characteristics, or maximizing the total value of the combination of the one or more directly controlled characteristics and/or indirectly controlled characteristics.

31. The computer-readable medium of claim 30, wherein a weighting factor is imposed on one or more of the costs of the one or more directly controlled and/or indirectly controlled characteristics.

32. The computer-readable medium of claim 31, wherein one or more of the directly controlled characteristics and/or indirectly controlled characteristics has an acceptable range, and the cost function has a minimum value at a specific location along the acceptable range, or the value function has a maximum value at a specific location along the acceptable range.

33. The computer-readable medium of claim 30, wherein the one or more directly controlled characteristics are selected from the group of characteristics consisting of:
 positioning on the workpiece the one or more final pieces to be portioned from the workpiece;
 the shape of the one or more final pieces to be portioned from the workpiece;
 the size of the one or more final pieces to be portioned from the workpiece;
 the location on the workpiece that the one or more final pieces are to be portioned from the workpiece;
 the number of final pieces to be portioned from the workpiece;
 the weight of the one or more final pieces to be portioned from the workpiece;
 the angle of cutters used to portion the workpiece; and
 physical attribute or features of the workpiece.

34. The computer-readable medium of claim 30, wherein the number of final pieces to be portioned from the workpiece is selected from the group consisting of: one final piece to be portioned from the workpiece utilizing one directly controlled characteristic; one final piece to be portioned from the workpiece utilizing more than one directly controlled characteristic; two final pieces to be portioned from the workpiece utilizing the same directly controlled characteristic for each final piece; two final pieces to be portioned from the workpiece and utilizing two or more different characteristics for each final piece; and more than two final pieces to be portioned from each workpiece and utilizing for each final piece at least two sets of different directly controlled characteristics.

35. The computer-readable medium of claim 30, wherein the indirectly controlled characteristics are selected from the group consisting of:
 the weight of the portioned final piece;
 the shape conformance of the portioned final piece;
 the average thickness of the portioned final piece;
 the maximum thickness of the portioned final piece;
 the flatness of the portioned final piece;
 the roughness of the portioned final piece;
 the length of the portioned final piece;
 the width of the portioned final piece;
 the plan-view area of the portioned final piece;
 the amount of fat present on the portioned final piece;
 program errors occurring;
 errors in the shape, size, location, position, or orientation of the workpiece determined by scanning the workpiece; and
 the extent of discontinuities of the portioned final piece.

36. The method of claim 1, wherein the one or more directly controlled characteristics comprises positioning on a workpiece one or more final pieces to be portioned from the workpiece by varying the size(s) of the one or more final pieces and moving the one or more final pieces about the workpiece until optimum positions for the one or more final pieces are located.

37. The system according to claim 20, wherein the one or more directly controlled characteristics comprises positioning on a workpiece one or more final pieces to be portioned from the workpiece by varying the sizes of the one or more final pieces and moving the one or more final pieces about the workpiece until optimum positions for the one or more final pieces are located.

38. The computer-readable medium of claim 30, wherein the one or more directly controlled characteristics comprises positioning on a workpiece one or more final pieces to be portioned from the workpiece by varying the sizes of the one or more final pieces and moving the one or more final pieces about the workpiece until optimum positions for the one or more final pieces are located.

39. The method of claim 1, further comprising:
 selecting one or more potential physical attributes of the workpiece as a directly controlled characteristic;
 analyzing the workpiece to locate the selected physical attribute on the workpiece; and
 locating the one or more final pieces on the workpiece based on the location of the selected physical attribute.

40. The method of claim 39, further comprising locating the one or more final pieces on the workpiece to avoid the selected physical attribute.

41. The method of claim 40, wherein the selected physical attribute is an attribute selected from the group consisting of:
 bone;
 fat;
 a tear of the workpiece;
 a hole in the workpiece;
 the keel of a poultry breast;
 cartilage;
 tendon; and
 edge of the workpiece.

42. The system according to claim 37, wherein:
 the one or more directly controlled characteristics is a selected physical attribute of the workpiece;
 the workpiece is analyzed to locate the selected physical attribute on the workpiece; and
 the one or more final piece is located on the workpiece based on the location of the selected physical attribute.

43. The system according to claim 42, wherein the one or more final pieces are located on the workpiece to avoid the selected physical attribute.

44. The system according to claim 42, wherein the selected physical attribute is an attribute selected from the group consisting of:
 bone;
 fat;
 a tear of the workpiece;
 a hole in the workpiece;
 the keel of a poultry breast;
 cartilage;
 tendon; and
 edge of the workpiece.

45. The computer-readable medium according to claim 30, wherein:
 the one or more directly controlled characteristics is a selected physical attribute of the workpiece;
 the workpiece is analyzed to locate the selected physical attribute on the workpiece; and
 the one or more final pieces are located on the workpiece based on the location of the selected physical attribute.

46. The computer-readable medium according to claim 45, wherein the one or more final piece is located on the workpiece to avoid the selected physical attribute.

47. The computer-readable medium according to claim 45, wherein the selected physical attribute is an attribute selected from the group consisting of:
- bone;
- fat;
- a tear of the workpiece;
- a hole in the workpiece;
- the keel of a poultry breast;
- cartilage;
- tendon; and
- edge of the workpiece.

48. The method of claim 1, wherein a plurality of algorithms are simultaneously utilized to analyze potentially acceptable one or more directly controlled characteristics until an acceptable set of one or more directly controlled characteristics and one or more indirectly controlled characteristics are determined.

49. The system of claim 23, wherein a plurality of algorithms are simultaneously utilized to analyze potentially acceptable one or more directly controlled characteristics until an acceptable set of one or more directly controlled characteristics and one or more indirectly controlled characteristics are determined.

50. The computer-readable medium of claim 30, wherein a plurality of algorithms are simultaneously utilized to analyze potentially acceptable on or more directly controlled characteristics until an acceptable set of one or more directly controlled characteristics and one or more indirectly controlled characteristics are determined.

51. The method of claim 1, wherein:
simulating portioning of the workpiece comprises simulating portioning a plurality of final pieces from the workpiece; and
the same algorithm is used to select potentially acceptable one or more directly controlled characteristic(s) of the plurality of the final pieces.

52. The method of claim 51, where the same directly controlled characteristic(s) is/are applied to each of the plurality of final pieces.

53. The system of claim 23, wherein:
the step of simulating portioning of the workpiece comprises simulating portioning of a plurality of final pieces from the workpiece; and
the same algorithm is used to select potentially acceptable one or more directly controlled characteristics of the plurality of the final pieces.

54. The system of claim 53, wherein the same directly controlled characteristic(s) is/are applied to each of the plurality of final pieces.

55. The computer-readable medium of claim 30, wherein:
simulating portioning of the workpiece comprises simulating portioning a plurality of final pieces from the workpiece; and
the same algorithm is used to select potentially acceptable one or more directly controlled characteristics of the plurality of final pieces.

56. The computer-readable medium of claim 55, wherein the same directly controlled characteristic(s) is/are applied to each of a plurality of final pieces.

57. The method of claim 1, wherein:
the workpiece comprising at least two sections defined by a physical attribute of the workpiece; and
wherein the one or more directly controlled characteristic(s) comprising positioning on the workpiece one or more final pieces to be portioned from each section of the workpiece.

58. The method of claim 57, wherein the physical attribute is selected from the group consisting of:
(a) the keel of a poultry breast;
(b) the rib of an animal workpiece; and
(c) the edge of the workpiece.

59. The system of claim 20, wherein:
the workpiece comprising at least two sections defined by a physical attribute of the workpiece; and
the one or more directly controlled characteristic(s) comprising positioning on the workpiece one or more final pieces to be portioned from each section of the workpiece.

60. The system of claim 59, wherein the physical attribute is selected from the group consisting of:
(a) the keel of a poultry breast;
(b) the rib of an animal workpiece; and
(c) the edge of the workpiece.

61. The computer-readable medium of claim 30, wherein:
the workpiece comprising at least two sections defined by a physical attribute of the workpiece; and
the one or more directly controlled characteristic(s) comprising positioning on the workpiece one or more final pieces to be portioned from each section of the workpiece.

62. The computer-readable medium of claim 61, wherein the physical attribute is selected from the group consisting of:
(a) the keel of a poultry breast;
(b) the rib of an animal workpiece; and
(c) the edge of the workpiece.

* * * * *

UNITED STATES PATENT AND TRADEMARK OFFICE
CERTIFICATE OF CORRECTION

PATENT NO.       : 8,688,259 B1
APPLICATION NO.  : 13/013771
DATED            : April 1, 2014
INVENTOR(S)      : G. R. Blaine et al.

It is certified that error appears in the above-identified patent and that said Letters Patent is hereby corrected as shown below:

Title page

(75) Inventors
Pg. 1, col. 1

"John R. Strong, Bellevue, WA (US)" should read
--David A. Below, Port Clinton, OH (US)--

Claims

23           4
(Claim 15, line 10)

"plurality final" should read --plurality of final--

29           26
(Claim 50, line 3)

"on or more" should read --one or more--

Signed and Sealed this
Sixteenth Day of February, 2016

Michelle K. Lee
*Director of the United States Patent and Trademark Office*